(12) United States Patent
Shigematsu et al.

(10) Patent No.: US 11,762,501 B2
(45) Date of Patent: Sep. 19, 2023

(54) INFORMATION PROCESSING APPARATUS AND CONTROL METHOD

(71) Applicant: Lenovo (Singapore) Pte. Ltd., Singapore (SG)

(72) Inventors: Yuichi Shigematsu, Kanagawa (JP); Seiichi Kawano, Kanagawa (JP); Ryohta Nomura, Kanagawa (JP); Yoshitsugu Suzuki, Kanagawa (JP)

(73) Assignee: Lenovo (Singapore) Pte. Ltd., Singapore (SG)

(*) Notice: Subject to any disclaimer, the term of this patent is extended or adjusted under 35 U.S.C. 154(b) by 0 days.

(21) Appl. No.: 17/702,167

(22) Filed: Mar. 23, 2022

(65) Prior Publication Data

US 2022/0342529 A1 Oct. 27, 2022

(30) Foreign Application Priority Data

Apr. 23, 2021 (JP) .................. 2021-073285

(51) Int. Cl.
*G06F 3/0354* (2013.01)
*G06F 3/041* (2006.01)
*G06F 3/04883* (2022.01)

(52) U.S. Cl.
CPC ...... *G06F 3/04166* (2019.05); *G06F 3/03547* (2013.01); *G06F 3/04883* (2013.01); *G06F 2203/04808* (2013.01)

(58) Field of Classification Search
CPC .... G06F 3/0317; G06F 3/03545; G06F 3/033; G06F 3/037
See application file for complete search history.

(56) References Cited

U.S. PATENT DOCUMENTS

| | | |
|---|---|---|
| 2013/0002573 A1 | 1/2013 | Baba |
| 2013/0141365 A1* | 6/2013 | Lynn ............... G06F 3/043 345/173 |
| 2014/0160085 A1* | 6/2014 | Rabii ............. G06F 3/0418 345/178 |
| 2015/0153951 A1 | 6/2015 | Kim et al. |

(Continued)

FOREIGN PATENT DOCUMENTS

| | | |
|---|---|---|
| JP | H09-146689 A | 6/1997 |
| JP | 2014-6761 A | 1/2014 |

(Continued)

OTHER PUBLICATIONS

Extended European Search Report issued in corresponding European Patent Application No. EP 22167721.4 dated Sep. 16, 2022 (9 pages).

*Primary Examiner* — Ryan A Lubit
(74) *Attorney, Agent, or Firm* — Osha Bergman Watanabe & Burton LLP

(57) ABSTRACT

An information processing apparatus includes a display unit; a touch panel configured to detect a touch position at which a touch operation is performed on the display unit; a function setting module configured to set at least one area of a first area functioning as a touch screen and a second area functioning as a precision touch pad with respect to a touch panel area where the touch panel is formed; and a polling rate setting module configured to raise a polling rate in an area where the second area is set in the touch panel area when the second area is set for the touch panel area.

14 Claims, 19 Drawing Sheets

(56) References Cited

U.S. PATENT DOCUMENTS

| | | | |
|---|---|---|---|
| 2015/0193031 A1* | 7/2015 | Tilak | G06F 3/0416 345/173 |
| 2016/0034059 A1* | 2/2016 | Graf | G06F 1/16 345/173 |
| 2016/0103495 A1 | 4/2016 | Takatsuka et al. | |
| 2018/0011566 A1 | 1/2018 | Ahsan et al. | |
| 2018/0011588 A1* | 1/2018 | Lu | G06F 3/041661 |
| 2020/0379638 A1* | 12/2020 | Zhu | G06F 3/04883 |

FOREIGN PATENT DOCUMENTS

| | | |
|---|---|---|
| JP | 2014-52950 A | 3/2014 |
| JP | 2014-241139 A | 12/2014 |
| JP | 2016-181207 A | 10/2016 |
| JP | 2020-135367 A | 8/2020 |
| WO | 2022/093346 A1 | 5/2022 |

* cited by examiner

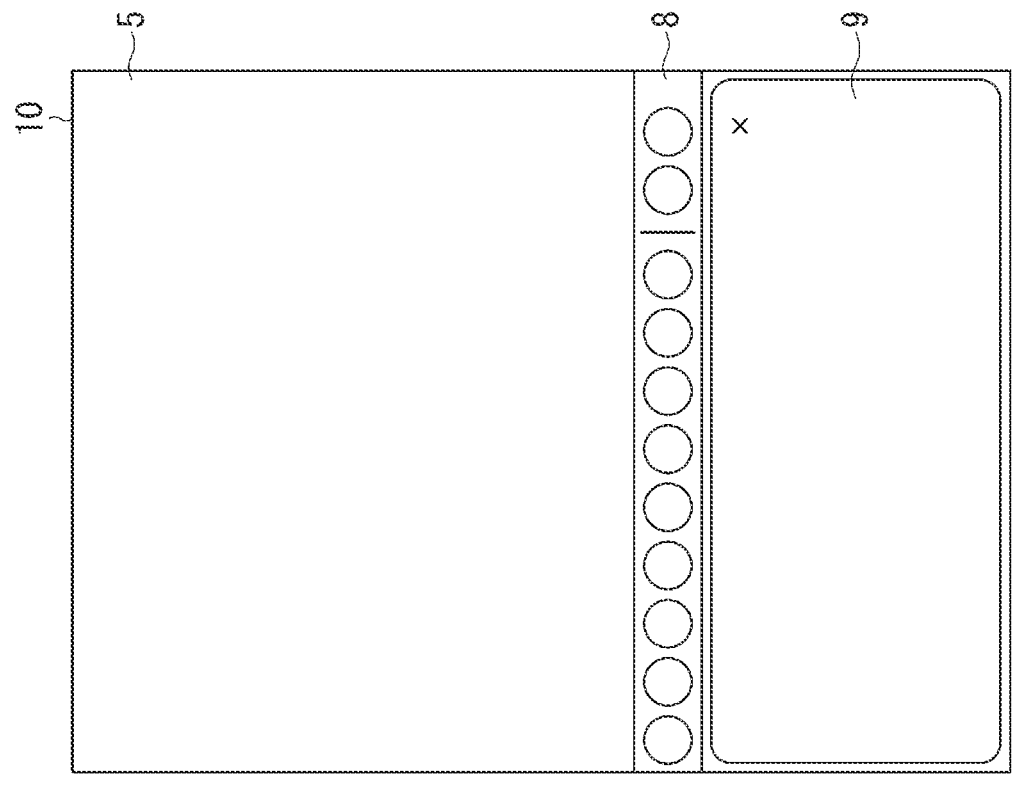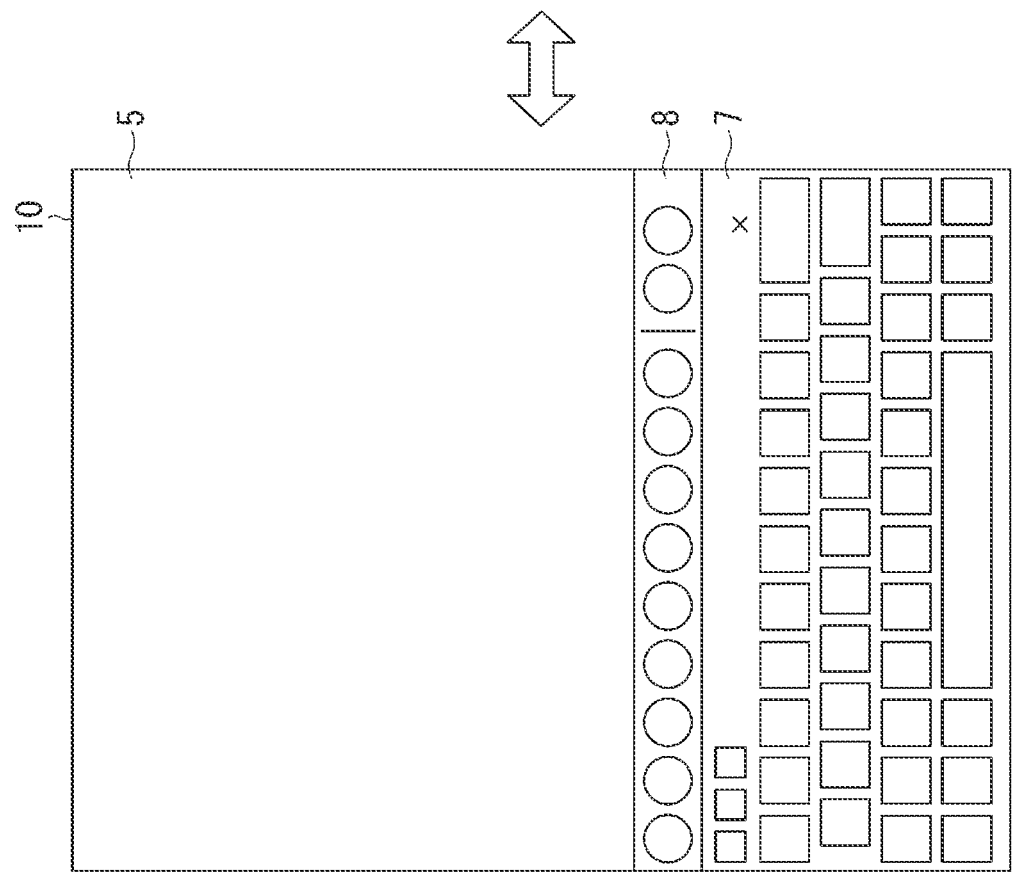
FIG. 2

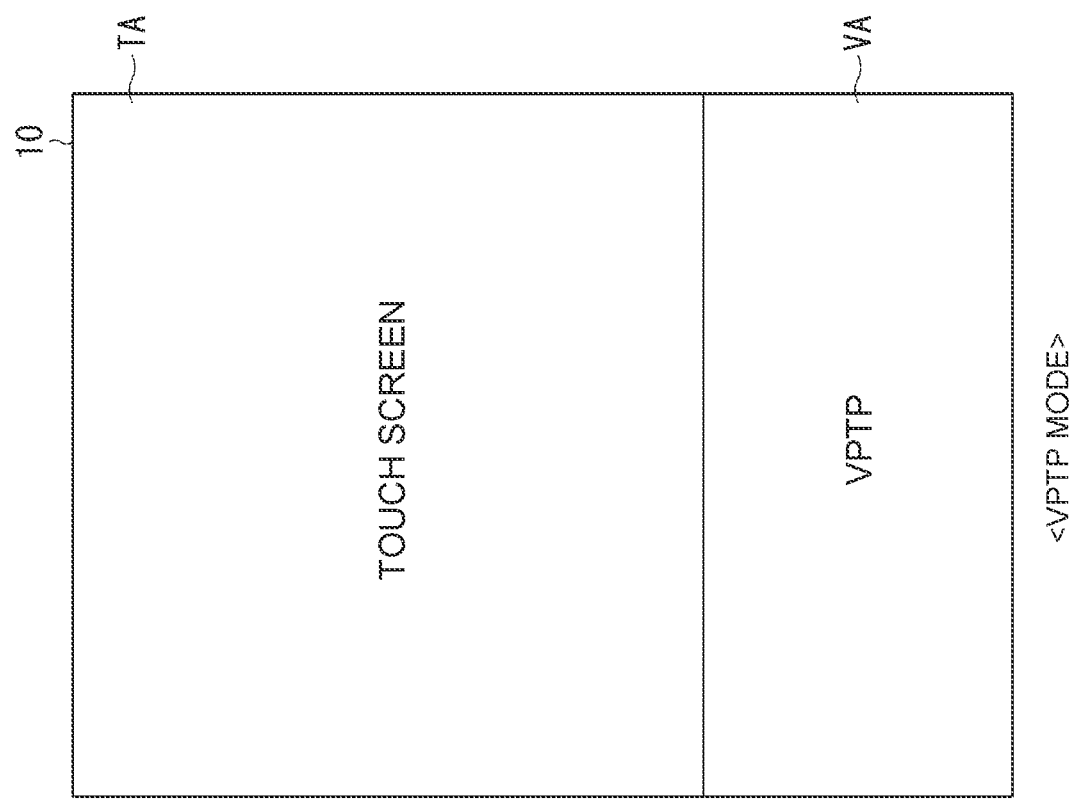
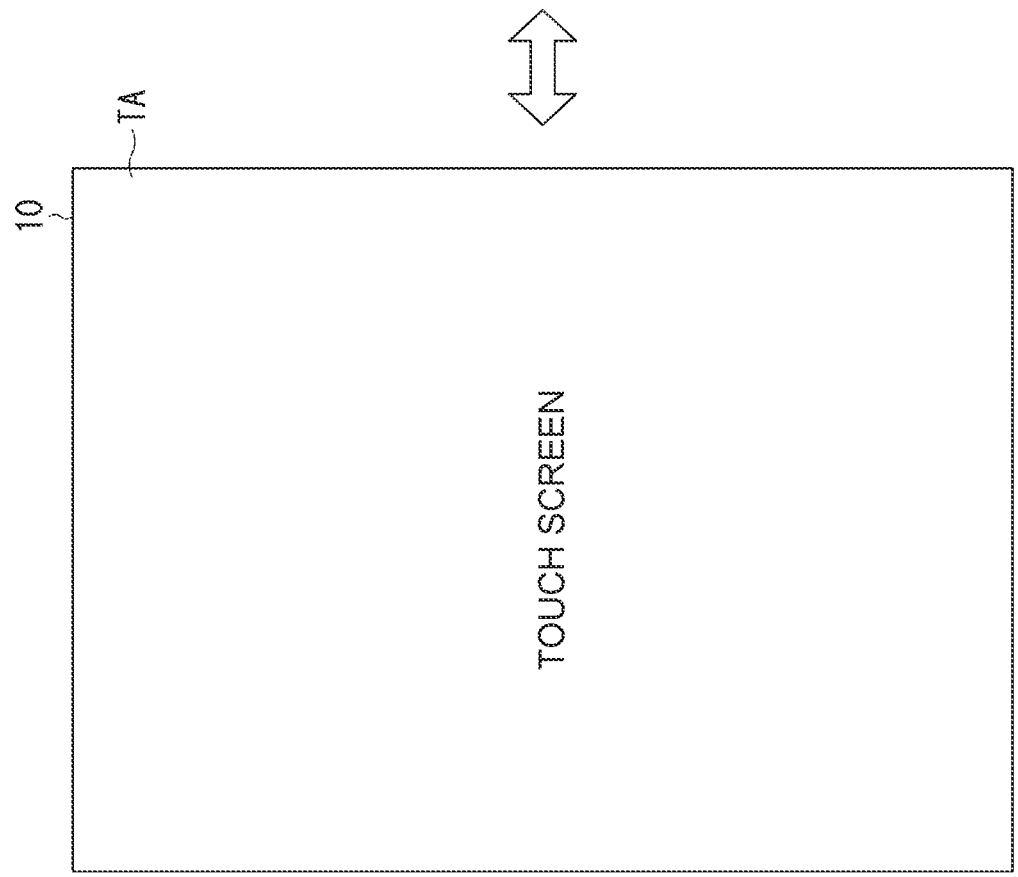
FIG. 3

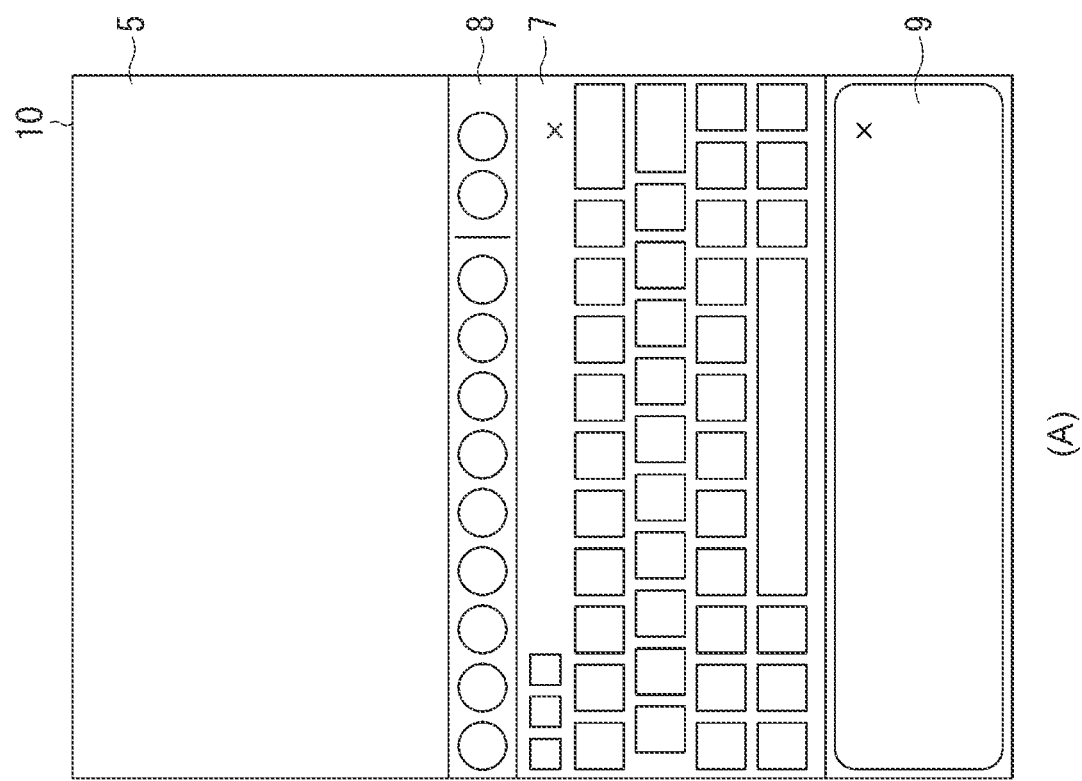
FIG. 12

INFORMATION PROCESSING APPARATUS AND CONTROL METHOD

CROSS-REFERENCE TO RELATED APPLICATIONS

This application claims priority to Japanese Patent Application No. 2021-73285 filed Apr. 23, 2021, the contents of which are hereby incorporated herein by reference in their entirety.

TECHNICAL FIELD

The present invention relates to an information processing apparatus and a control method.

BACKGROUND

In recent years, various terminals (e.g., tablet terminals) configured to display a virtual touch pad on a predetermined area of a touch screen have been proposed. A user can operate, for example, a mouse cursor by touch operations on the virtual touch pad.

For example, Japanese Unexamined Patent Application Publication No. 2014-241139 discloses a technology of displaying a virtual touch pad and a user interface of an operating system on a touch screen and controlling a motion of a mouse cursor based on a touch operation of a user on the virtual touch pad.

With the virtual touch pad disclosed in Japanese Unexamined Patent Application Publication No. 2014-241139, the user cannot perform various gesture operations other than the mouse cursor operation. Herein, various gesture operations include operations using a precision touch pad, and include, for example, a screen scroll operation, an enlargement or reduction operation of screen display, etc. by multi-touch. Therefore, it is considered to allow the user to use a function of the precision touch pad by using the virtual touch pad to be able to improve a user experience on the touch screen.

Meanwhile, regarding the touch screen, it is known that a finer operation is enabled as a polling rate is higher, and required polling rates are different between the virtual touch pad and the precision touch pad. For that reason, when realizing the function of the precision touch pad by using the virtual touch pad, it is preferable that a polling rate in an area for which the function of the precision touch pad is set can be changed to a required polling rate.

One or more embodiments of the present invention provide an information processing apparatus and a control method that can improve a user experience on a touch screen.

SUMMARY

An information processing apparatus according to the first aspect of the present invention includes: a display unit; a touch panel configured to detect a touch position at which a touch operation is performed on the display unit; a function setting module configured to set at least one area of a first area functioning as a touch screen and a second area functioning as a precision touch pad with respect to a touch panel area where the touch panel is formed; and a polling rate setting module configured to raise a polling rate in an area where the second area is set in the touch panel area when the second area is set for the touch panel area.

Moreover, in the information processing apparatus, the polling rate setting module may be configured to raise the polling rate in the area where the second area is set in the touch panel area up to at least 125 Hz.

Moreover, in the information processing apparatus, the polling rate setting module may be configured to restore the polling rate in the area where the second area is set in the touch panel area when setting of the second area is canceled.

Moreover, the information processing apparatus may further includes: a sensor device configured to determine a posture of the apparatus itself; a posture detecting module configured to detect a posture of the apparatus itself based on posture information related to the posture of the apparatus itself acquired by the sensor device; a mode determining module configured to determine a mode in which the apparatus itself is used based on the detected posture; and a display processing module configured to display a virtual precision touch pad, which is the precision touch pad as a virtual pad, at a position in the touch panel area according to the determined mode.

Moreover, the information processing apparatus may further includes: a touch operation determining module configured to determine whether the touch operation is an operation on which a process should be performed based on a magnitude relationship of contact information with respect to a threshold, the contact information being information related to contact between an operation medium and the touch panel that is acquired when the touch operation by the operation medium is performed; and a threshold setting module configured to change the threshold in the area where the second area is set in the touch panel area to a value different from the threshold in another area in the touch panel area when the second area is set for the touch panel area.

Moreover, in the information processing apparatus, the threshold setting module may be configured to restore the threshold in the area where the second area is set in the touch panel area when setting of the second area is canceled.

A control method for an information processing apparatus, which includes a display unit and a touch panel configured to detect a touch position at which a touch operation is performed on the display unit, according to the second aspect of the present invention includes: setting, by a function setting module, at least one area of a first area functioning as a touch screen and a second area functioning as a precision touch pad with respect to a touch panel area where the touch panel is formed; and raising, by a polling rate setting module, a polling rate in an area where the second area is set in the touch panel area when the second area is set for the touch panel area.

The above-described aspects of the present invention can improve a user experience on a touch screen.

BRIEF DESCRIPTION OF THE DRAWINGS

FIG. 2 is a diagram illustrating a display example of a touch screen in each mode according to the first embodiment;

FIG. 3 is a diagram illustrating a function example of the touch screen in each mode according to the first embodiment;

FIG. 12 is a diagram illustrating an example of the display and function of the touch screen according to a first modified example of the first embodiment;

DETAILED DESCRIPTION

Figure 1:
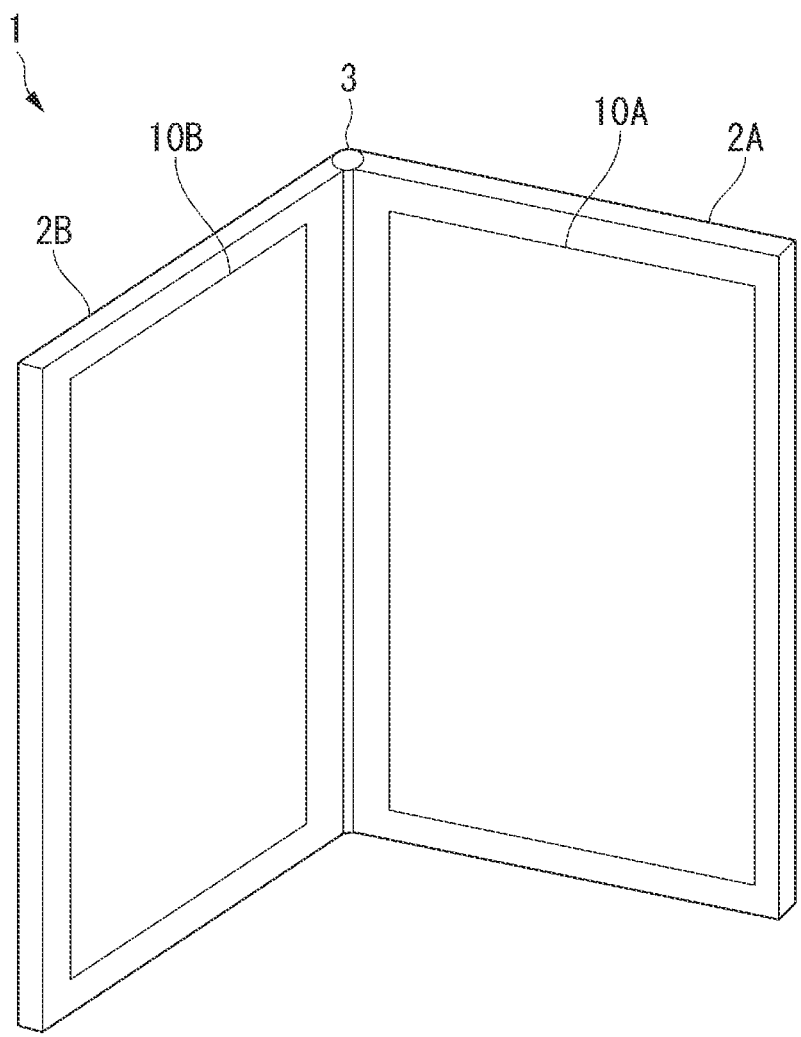
FIG. 1 is a diagram illustrating an example of an information processing apparatus according to a first embodiment.

Hereinafter, exemplary embodiments of the present invention will be described in detail with reference to the accompanying drawings.

1. First Embodiment

First, the first embodiment will be described with reference to FIGS. 1 to 13.

The present invention relates to an information processing apparatus configured to cause a touch screen to function as at least one of a touch screen and a precision touch pad (PTP). A precision touch pad that is virtually displayed on the touch screen is also hereinafter referred to as a virtual precision touch pad (VPTP).

The touch screen according to the first embodiment means an input-output device that includes a display screen on which various types of information can be displayed and a touch panel that can detect touch operations. A user can operate the touch screen by directly touching an operation target displayed on the touch screen. For example, the user can perform keyboard input by directly touching each key of an on-screen keyboard (OSK) displayed on the touch screen.

The PTP according to the first embodiment means a touch pad that can perform gesture operations. The PTP can also perform various gesture operations other than a mouse cursor operation. For example, when performing a gesture of bringing two fingers into contact with the surface of the PTP and sliding the two fingers in a direction parallel to the surface, a screen is scrolled. Moreover, when performing a gesture of bringing three fingers into contact with the surface of the PTP and swiping the three fingers from side to side, switching is performed between the display of a window and the display of an application. Moreover, when performing a gesture of bringing two fingers into contact with the surface of the PTP and making a pinch, the display is enlarged or reduced. Note that the number of fingers in contact with the PTP and the type of gesture in the gesture operations are not limited to such the examples. Moreover, a combination of the number of fingers and the type of gesture is not limited to such the examples.

The information processing apparatus according to the first embodiment is realized by a terminal having at least a touch screen. For example, the information processing apparatus is realized by a terminal, such as a laptop PC (personal computer), a tablet terminal, and a smartphone, having a touch screen. Moreover, the information processing apparatus may be realized by a foldable terminal (foldable device) that can fold its touch screen. Note that a terminal realizing the information processing apparatus is not limited to such the examples.

Moreover, the number of touch screens included in the information processing apparatus is not particularly limited. For example, the information processing apparatus includes two displays (dual display), and one of the two displays may be a touch screen or both the two displays may be touch screens. Hereinafter, the information processing apparatus will be described about the case where it is a laptop PC having two touch screens, as an example.

1. OUTLINE

First, the outline of the first embodiment will be described with reference to FIGS. 1 to 3. FIG. 1 is a diagram illustrating an example of an information processing apparatus 1 according to the first embodiment. As illustrated in FIG. 1, the information processing apparatus 1 includes a first chassis 2A and a second chassis 2B of which both are substantially rectangular solids. The first chassis 2A and the second chassis 2B are connected by a connection part 3 at their respective ends. The connection part 3 is a hinge for example, and supports the first chassis 2A and the second chassis 2B so as to be openable and closable.

The first chassis 2A includes a touch screen 10A and the second chassis 2B includes a touch screen 10B. Note that, in the following description, either A or B is added to the end of the reference number when distinguishing the touch screens 10A and 10B, and A and B are omitted when not distinguishing the touch screens 10A and 10B. Hereinafter, the screen display on the touch screen 10 will be described as an example of vertical screen display in which one of two short sides constituting the touch screen 10 is in a top direction of the screen display and the other is in a bottom direction of the screen display.

The information processing apparatus 1 according to the first embodiment is set with various modes related to the functions of the touch screen 10. As an example, the modes related to the functions of the touch screen 10 include a normal mode (first mode) and a VPTP mode (second mode).

The normal mode is a mode in which a predetermined area (first area) in a touch panel area where the touch panel of the touch screen 10 is formed functions as a touch screen. The predetermined area (hereinafter, also referred to as "touch screen area") that functions as the touch screen is the entire area of the touch panel area, for example. In the normal mode, the OSK etc. displayed on the touch screen 10 can be operated for example.

The function acting as the touch screen in the touch screen area is directly controlled by an operating system (OS) in accordance with a predetermined operation. Herein, a predetermined operation is a touch operation, for example. Specifically, the predetermined operation is an operation of touching a target displayed on the touch screen 10. In the normal mode, a user interface (UI) such as a desktop screen, a task bar, and the OSK is displayed in the touch screen area by the control of the OS, for example. Moreover, when the OSK is displayed, an application operating on the OS causes the UI of a tool bar for operating the application to be displayed in the touch screen area. The user can perform an operation of switching between the normal mode and the VPTP mode by operating the tool bar with an operation medium, for example.

The VPTP mode is a mode in which a predetermined area (second area) in the touch panel area functions as the PTP. The predetermined area (hereinafter, also referred to as "VPTP area") that functions as the PTP is an area where the VPTP is displayed, within the entire area of the touch panel area, for example. Note that, within the entire area of the touch panel area, an area other than the VPTP area is the touch screen area.

The function acting as the PTP in the VPTP area is not directly controlled by the OS in accordance with a predetermined operation. Herein, a predetermined operation is a touch operation. Specifically, the predetermined operation is a gesture operation. In the VPTP mode, the control according to the gesture operation of the user is performed by a control program (firmware) for the touch screen 10, for example. This control program is firmware executed by an embedded controller (EC) to be described later, and is also referred to as "EC firmware" hereinafter. Moreover, the VPTP is displayed in the VPTP area by the control of an application. In the VPTP mode, the display controlled by the OS and the display controlled by the application are the same as in the normal mode.

The switching between the normal mode and the VPTP mode is controlled by the application. The application instructs the EC firmware to set one of the modes based on the user input with respect to the application, for example. At this time, the application instructs the EC firmware to use definition information according to a mode to be set. Herein, definition information means information including information (hereinafter, also referred to as "hardware information") related to hardware. The definition information may include various hardware information, and includes, for example, hardware information on the touch screen 10 and hardware information on the PTP. The hardware information includes, for example, information on hardware type, size, etc. Moreover, when virtually displaying hardware on the touch screen 10, the hardware information includes size information indicating a virtual display size, position information indicating a virtual display position, display layout information indicating layout including other display targets, and the like. Moreover, the hardware information may include area setting information related to the setting of an area such as the touch screen area and the VPTP area. Note that information included in the definition information is not limited to such the examples.

When detecting a touch on the touch screen 10, the EC firmware generates a signal according to the set mode and an area on which a touch is detected and outputs the signal to the OS.

When a touch is detected during setting the normal mode, the EC firmware generates a touch screen signal (first signal) indicating that the touch screen 10 is touched as a touch screen and outputs the signal to the OS. The touch screen signal includes, for example, definition information on the touch screen 10 and coordinate information indicating a touch position. Note that, during setting the normal mode, a touch in the VPTP area is not detected because the entire area of the touch panel area is a touch screen area.

When a touch is detected in the VPTP area during setting the VPTP mode, the EC firmware generates a VPTP signal (second signal) indicating that the touch screen 10 is touched as the PTP and outputs the signal to the OS. The VPTP signal includes, for example, definition information on the PTP and coordinate information indicating a touch position. On the other hand, when a touch is detected in the touch screen area during setting the VPTP mode, the EC firmware generates a touch screen signal indicating that the touch screen 10 is touched as a touch screen and outputs the signal to the OS.

The OS that has received the signal from the EC firmware recognizes that hardware indicated by the definition information included in the received signal has been touched. At this time, the OS recognizes that the hardware indicated by the definition information is connected to the information processing apparatus 1. For example, when receiving the touch screen signal, the OS recognizes that the touch screen 10 is connected to the information processing apparatus 1. On the other hand, when receiving the VPTP signal, the OS recognizes that the PTP is connected to the information processing apparatus 1. Note that the touch screen 10 is physically connected to the information processing apparatus 1 in the first embodiment. However, the PTP is not physically connected to the information processing apparatus 1. In other words, even if hardware is not physically connected to the information processing apparatus 1, the OS can recognize this hardware based on its definition information.

Then, the OS performs an operation according to a coordinate position at which a touch is detected by the recognized hardware. When recognizing the touch screen 10, the OS performs an operation related to the touch screen 10. On the other hand, when recognizing the PTP, the OS performs an operation related to the PTP. As described above, the EC firmware can control the operation of the OS by generating the signal according to the set mode and the area on which the touch is detected and outputting the signal to the OS.

Herein, a relationship between the display and function in each mode will be described with reference to FIGS. 2 and 3. FIG. 2 is a diagram illustrating a display example of the touch screen 10 in each mode according to the first embodiment. FIG. 3 is a diagram illustrating a function example of the touch screen 10 in each mode according to the first embodiment.

As illustrated in the left drawing of FIG. 2, for example, a desktop 5, an OSK 7, and a tool bar 8 are displayed on the touch screen 10 in the normal mode. At this time, as illustrated in the left drawing of FIG. 3, a touch screen area TA where the desktop 5, the OSK 7, and the tool bar 8 are displayed functions as a touch screen.

On the other hand, as illustrated in the right drawing of FIG. 2, for example, the desktop 5, the tool bar 8, and a VPTP 9 are displayed on the touch screen 10 in the VPTP mode. At this time, as illustrated in the right drawing of FIG. 3, the touch screen area TA where the desktop 5 and the tool bar 8 are displayed functions as the touch screen, and a VPTP area VA where the VPTP 9 is displayed functions as the PTP.

2. HARDWARE CONFIGURATION

Figure 4:
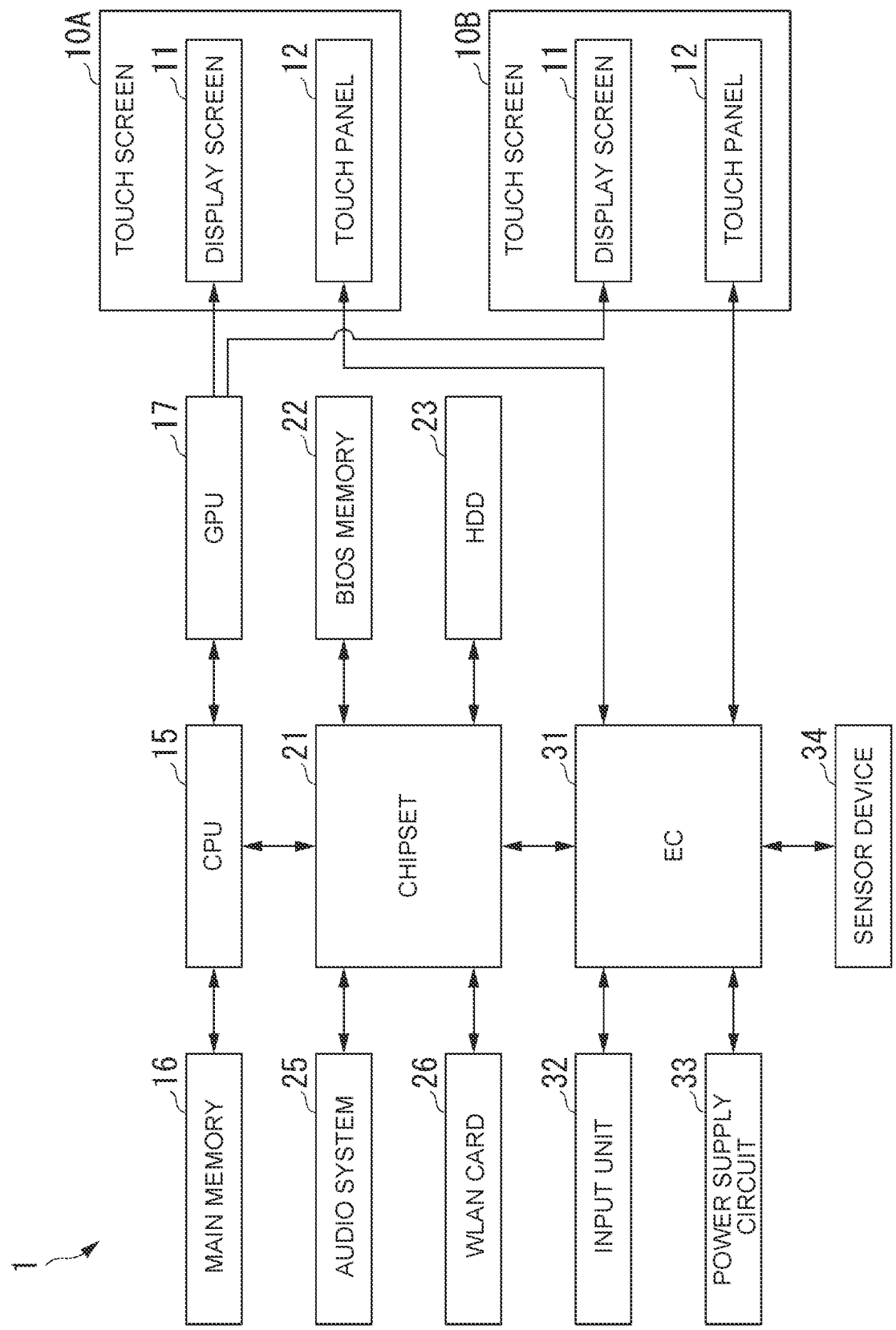
FIG. 4 is a diagram illustrating a hardware configuration example of the information processing apparatus according to the first embodiment.

As described above, the outline according to the first embodiment has been described. Next, the hardware configuration of the information processing apparatus 1 according to the first embodiment will be described with reference to FIG. 4. FIG. 4 is a diagram illustrating a hardware configuration example of the information processing apparatus 1 according to the first embodiment.

As illustrated in FIG. 4, the information processing apparatus 1 includes the touch screen 10A, the touch screen 10B, a central processing unit (CPU) 15, a main memory 16, a graphic processing unit (GPU) 17, and a chipset 21. The information processing apparatus 1 further includes a basic input output system (BIOS) memory 22, a hard disk drive (HDD) 23, an audio system 25, a wireless local area network (WLAN) card 26, an EC 31, an input unit 32, a power supply circuit 33, and a sensor device 34.

The touch screen 10 includes a display screen 11 and a touch panel 12. The touch screen 10 displays various types of information according to display data converted into video signals on the display screen 11, and also accepts operation input by an operation medium such as a finger of the user and a pen by detecting a touch by the operation medium or the proximity of the operation medium by using the touch panel 12.

For example, the display screen 11 is a display device such as an OLED display (organic electroluminescence display). Note that the display screen 11 may be configured to be foldable.

The touch panel 12 is arranged so as to overlap a display surface of the display screen 11. The touch panel 12 detects a touch position. Note that the touch panel 12 may be configured to be integrated with the display screen 11 and may be configured to be foldable in the same manner as the display screen 11.

The CPU 15 executes various arithmetic processes by program control to control the entire of the information processing apparatus 1.

The main memory 16 is a writable memory that is used as a reading area for an execution program of the CPU 15 or a working area for writing processing data of the execution program. The main memory 16 is configured by a plurality of dynamic random access memory (DRAM) chips, for example. The execution program includes various drivers, various services/utilities, application programs, etc. for operating the OS and peripheral devices by hardware.

The GPU 17 executes image processing to generate display data on the basis of the control of the CPU 15. The GPU 17 is connected to the display screen 11, and outputs the generated display data to the display screen 11.

The chipset 21 includes controllers of a universal serial bus (USB), a serial ATA (AT attachment), a serial peripheral interface (SPI) bus, a peripheral component interconnect (PCI) bus, a PCI-express bus, a low pin count (LPC) bus, and the like, and is connected to a plurality of devices. In FIG. 4, as an example of these devices, the BIOS memory 22, the HDD 23, the audio system 25, the WLAN card 26, and the EC 31 are connected to the chipset 21.

For example, the BIOS memory 22 is configured by an electrically rewritable nonvolatile memory such as an electrically erasable programmable read only memory (EEPROM) and a flash read only memory (ROM). The BIOS memory 22 stores therein system firmware for controlling the BIOS, the EC 31, and the like. The system firmware is firmware executed by the CPU 15, and is different from the EC firmware executed by the EC 31.

The HDD 23 (example of nonvolatile storage) stores therein OS, various drivers, various services/utilities, application programs, and various data.

The audio system 25 records, plays, and outputs sound data. For example, a microphone and a speaker are connected to the audio system 25.

The WLAN card 26 is connected to a network by wireless (radio) LAN to perform data communication.

The EC 31 is a one-chip microcomputer configured to monitor and control various devices (peripheral device, sensor, etc.) regardless of a system status of the information processing apparatus 1. The EC 31 includes a CPU, a read only memory (ROM), a random access memory (RAM) that are not illustrated. The EC 31 functions as a control unit that operates independently of the CPU 15 and mainly manages the internal operating environment of the information processing apparatus 1. The EC 31 reads a control program (EC firmware) previously stored in the ROM, and executes processes instructed by various instructions described in the read control program to realize various functions. Moreover, the EC 31 includes multi-channel A/D input terminal and D/A output terminal, a timer, a digital input/output terminal, and the like. The EC 31 is connected via these input/output terminals to the input unit 32, the power supply circuit 33, the sensor device 34, and the like, for example, and the EC 31 controls operations of them.

The input unit 32 is an input device configured to receive input from a power switch, a function switch, etc., for example.

The power supply circuit 33 includes, for example, a DC/DC converter, a charge/discharge unit, a battery unit, an AC/DC adapter, etc., and converts a DC voltage supplied from the AC/DC adapter or the battery unit into a plurality of voltages required to operate the information processing apparatus 1. Moreover, the power supply circuit 33 supplies electric power to each component of the information processing apparatus 1 on the basis of the control from the EC 31.

The sensor device 34 is a sensor device configured to determine a posture of the information processing apparatus 1 (the apparatus itself). The sensor device 34 includes a camera, an inertial measurement unit (IMU), an environmental sensor, etc., for example. The sensor device 34 acquires posture information related to the posture of the information processing apparatus 1, for example.

3. FUNCTIONAL CONFIGURATION

Figure 5:
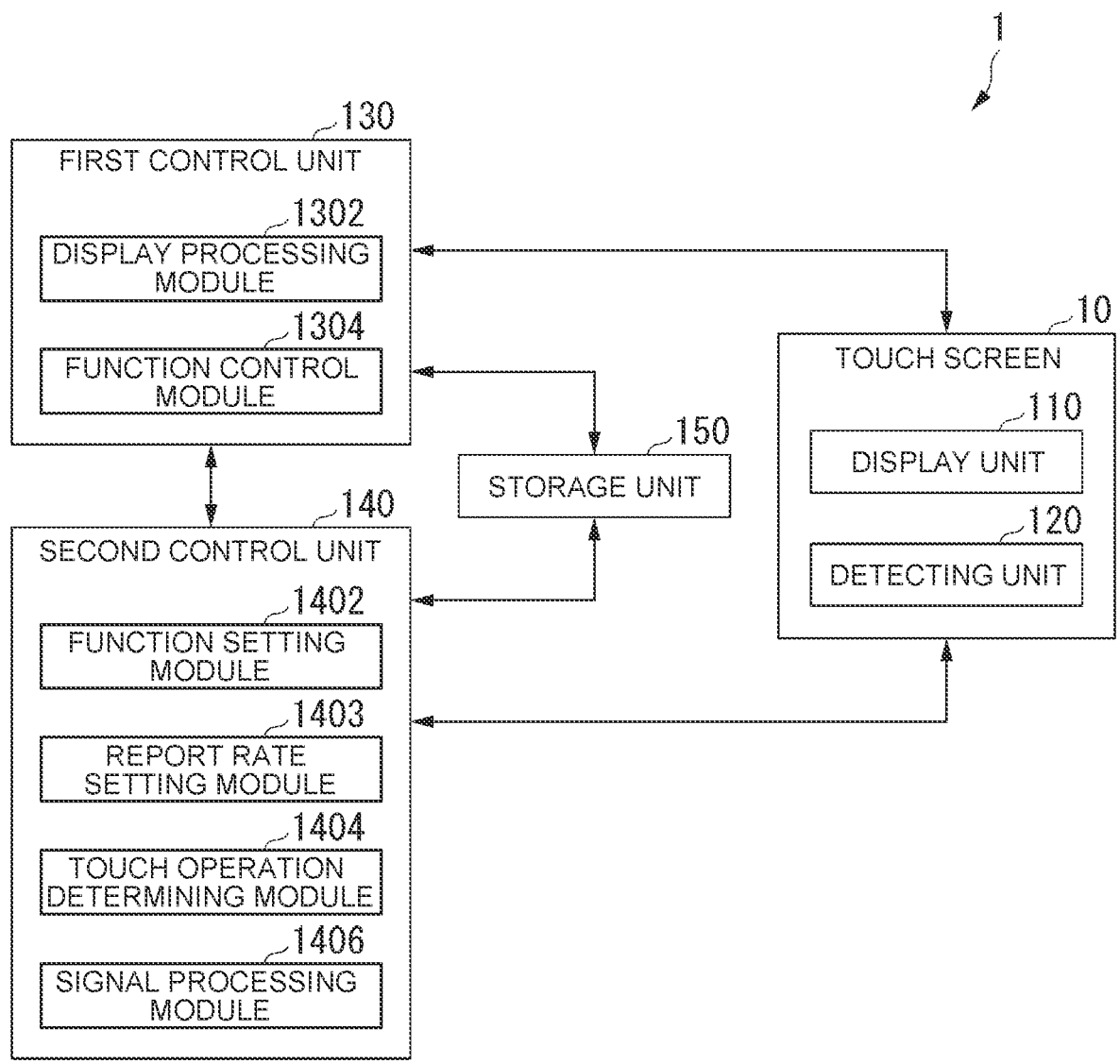
FIG. 5 is a block diagram illustrating a functional configuration example of the information processing apparatus according to the first embodiment.

As described above, the hardware configuration example of the information processing apparatus 1 according to the first embodiment has been described. Next, a functional configuration example of the information processing apparatus 1 according to the first embodiment will be described with reference to FIG. 5. FIG. 5 is a block diagram illustrating a functional configuration example of the information processing apparatus 1 according to the first embodiment.

As illustrated in FIG. 5 the information processing apparatus 1 includes a display unit 110, a detecting unit 120, a first control unit 130, a second control unit 140, and a storage unit 150.

(1) Display Unit 110

The display unit 110 has a function of displaying various types of information input from the first control unit 130. The display unit 110 is realized by, for example, the display screen 11 described with reference to FIG. 4, and displays the UI such as the desktop 5, the task bar, the OSK 7, the tool bar 8, and the VPTP 9 on the display screen 11. Note that information displayed by the display unit 110 is not limited to such the examples.

(2) Detecting Unit 120

The detecting unit 120 has a function of detecting a touch position by an operation medium in the touch panel area. The detecting unit 120 is realized by, for example, the touch panel 12 described with reference to FIG. 4, and outputs the touch position detected by the touch panel 12 to the second control unit 140.

(3) First Control Unit 130

The first control unit 130 has a function of controlling the overall operation of the information processing apparatus 1. The first control unit 130 is configured to include the CPU 15, the GPU 17, etc., for example. The function of the first control unit 130 is realized, for example, by the CPU 15 executing programs such as system firmware such as BIOS, the OS, and various applications (e.g., applications operating on the OS) to boot (activate) a system and performing various operations, processing, etc. To realize this function, the first control unit 130 includes a display processing module 1302 and a function control module 1304.

(Display Processing Module 1302)

The display processing module 1302 has a function of controlling the display on the display unit 110. Based on an operation by the user, for example, the display processing module 1302 controls the display on the display unit 110. As an example, the operation by the user includes an operation of displaying or hiding the OSK 7, an operation of setting the normal mode or the VPTP mode, and the like.

When the operation of displaying the OSK 7 is input, the display processing module 1302 causes the display unit 110 to display the OSK 7. When displaying the OSK 7, the display processing module 1302 further causes the display unit 110 to display the tool bar 8. On the other hand, when the operation of hiding the OSK 7 is input, the display processing module 1302 causes the display unit 110 to hide the OSK 7 and the tool bar 8.

When the operation of setting the VPTP mode is input during setting the normal mode, the display processing module 1302 causes the display unit 110 to display the VPTP 9 based on the definition information. For example, the display processing module 1302 acquires information such as size information of the VPTP 9 and position information of the VPTP 9 with reference to the definition information. After acquisition, the display processing module 1302 generates display data of the VPTP 9 from the acquired size information, and causes the display unit 110 to display the generated display data at a position indicated by the position information.

Based on the definition information, the display processing module 1302 controls a display layout of the OSK 7 displayed on the touch screen area TA and the VPTP 9 displayed on the VPTP area VA. For example, when the size and display position of the VPTP 9 indicated by the definition information are the same as the size and display position of the OSK 7 that is already displayed, the display processing module 1302 displays the VPTP 9 in the display area of the OSK 7. At this time, the display processing module 1302 causes the display unit 110 to hide the OSK 7 and then to display the VPTP 9. Note that the display processing module 1302 may cause the display unit 110 to display the VPTP 9 by overlaying the VPTP 9 on the OSK 7 without hiding the OSK 7. As a result, the display processing module 1302 can secure a wider area other than the VPTP 9 by the display unit 110, compared with the case where the VPTP 9 is displayed in an area different from the area of the OSK 7.

On the other hand, when the operation of setting the normal mode is input during setting the VPTP mode, the display processing module 1302 causes the display unit 110 to hide the VPTP 9. At this time, the display processing module 1302 causes the display unit 110 to redisplay the OSK 7. As a result, the user can again operate the OSK 7. Note that, when the VPTP 9 is overlaid on the OSK 7 during setting the VPTP mode, the OSK 7 is displayed by hiding the VPTP 9. Therefore, when the operation of setting the normal mode is input in the state where the VPTP 9 is overlaid on the OSK, the display processing module 1302 does not need to perform a process of causing the display unit 110 to redisplay the OSK 7.

Note that a process of displaying or hiding the OSK 7 is executed by the OS, for example. Moreover, a process of displaying or hiding the tool bar 8 is executed by an application, for example. Moreover, a process of displaying or hiding the VPTP is executed by an application, for example.

(Function Control Module 1304)

The function control module 1304 has a function of controlling the function of the touch screen 10. For example, the function control module 1304 controls modes to be set for the touch screen 10. Specifically, based on an operation by the user, the function control module 1304 controls the setting of either the normal mode or the VPTP mode.

When an operation of switching to the VPTP mode is input during setting the normal mode, the function control module 1304 determines to cause a function setting module 1402 to be described later to set the VPTP mode for the touch screen 10. At this time, the function control module 1304 causes the function setting module 1402 to set the display area of the VPTP 9 in the touch panel area as the VPTP area VA. Specifically, the function control module 1304 acquires the size information and position information of the VPTP 9 with reference to the definition information. After acquisition, based on the size information and position information, the function control module 1304 causes the function setting module to set the display area of the VPTP 9 as the VPTP area VA. Moreover, the function control module 1304 causes the function setting module to set an area other than the VPTP area VA as the touch screen area TA.

On the other hand, when an operation of switching to the normal mode is input during setting the VPTP mode, the function control module 1304 determines to cause the function setting module 1402 to set the normal mode for the touch screen 10. At this time, the function control module 1304 causes the function setting module 1402 to set the entire area of the touch panel area as the touch screen area TA.

As described above, based on the operation by the user, the function control module 1304 can switch between the normal mode and the VPTP mode to set the mode for the touch screen 10. Moreover, the function control module 1304 can set the VPTP area VA in the display area of the VPTP 9 of the display unit 110 when setting the VPTP mode so as to functionalize the predetermined area in the touch panel area as the PTP.

(4) Second Control Unit 140

The second control unit 140 has a function of controlling the overall operation of various devices (peripheral device, sensor, etc.). The second control unit 140 is configured to include the EC 31, for example. The function of the second control unit 140 is realized, for example, by the EC firmware executed by the EC 31 performing various operations, processing, etc. To realize this function, the second control unit 140 includes the function setting module 1402, a polling rate setting module 1403, a touch operation determining module 1404, and a signal processing module 1406. Note that the functions of the function setting module 1402, the touch operation determining module 1404, and the signal processing module 1406 to be described below are also realized by the EC firmware.

(Function Setting Module 1402)

The function setting module 1402 has a function of performing setting related to the function of the touch screen 10. The function setting module 1402 performs the setting of modes on the touch screen 10. For example, based on an instruction from the function control module 1304, the function setting module 1402 sets one mode of the normal mode and the VPTP mode for the touch screen 10. Specifically, when receiving an instruction from the function control module 1304 to set the normal mode, the function setting module 1402 sets the normal mode for the touch screen 10. On the other hand, when receiving an instruction from the function control module 1304 to set the VPTP mode, the function setting module 1402 sets the VPTP mode for the touch screen 10.

Moreover, the function setting module 1402 performs the setting of areas in the touch panel area of the touch screen 10. For example, based on an instruction from the function control module 1304, the function setting module 1402 sets at least one area of the touch screen area TA and the VPTP area VA with respect to the touch panel area. Specifically, when receiving an instruction from the function control module 1304 to set the touch screen area TA, the function setting module 1402 generates the touch screen area TA based on the definition information of the touch screen. After generation, the function setting module 1402 sets the generated touch screen area TA on the touch screen 10. Moreover, when receiving an instruction from the function control module 1304 to set the touch screen area TA and the VPTP area VA, the function setting module 1402 generates the VPTP area VA based on the definition information of the PTP. After generation, the function setting module 1402 sets the generated VPTP area VA on the touch screen 10. At this time, the function setting module 1402 overlays the generated VPTP area VA on the touch screen area TA already set in the touch panel area.

(Polling Rate Setting Module 1403)

The polling rate setting module 1403 has a function of setting a polling rate in the touch panel area of the touch screen 10. For example, the polling rate setting module 1403 changes a polling rate in the touch panel area in accordance with whether the VPTP area VA is set in the touch panel area. In the first embodiment, it is assumed that a polling rate before change in the touch panel area is set to 120 Hz.

Specifically, when the VPTP area VA is set for the touch panel area, the polling rate setting module 1403 raises a polling rate in an area where the VPTP area VA is set in the touch panel area.

By employing this configuration, in the VPTP area VA where the polling rate is high, a response to the touch operation becomes faster than that in another area (the touch screen area TA) where the polling rate is not changed. For that reason, the user can perform a finer touch operation in the VPTP area VA than that in the touch screen area TA. As a result, a user experience on the touch screen 10 is also improved.

Therefore, the polling rate setting module 1403 can improve a user experience on the touch screen 10 by increasing the polling rate in the VPTP area VA.

The polling rate setting module 1403 changes the polling rate in the area where the VPTP area VA is set in the touch panel area to a polling rate according to the PTP request. For example, the acquisition of logo certification by WHQL (Windows Hardware Quality Labs) requires that the polling rate of the PTP is 125 Hz. Therefore, in the first embodiment, the polling rate setting module 1403 raises the polling rate in the area where the VPTP area VA is set in the touch panel area up to at least 125 Hz. As a result, it is possible to improve a user experience on the touch screen 10 and also acquire the logo certification of WHQL.

On the other hand, when the setting of the VPTP area VA is canceled, the polling rate setting module 1403 restores the polling rate in the area where the VPTP area VA is set in the touch panel area. For example, the polling rate setting module 1403 returns the polling rate in this area from 125 Hz to 120 Hz.

Note that the change of the polling rate cannot be realized by the control by software such as the OS and various applications. However, in the present invention, the change of the polling rate can be realized by linking the control by firmware (EC firmware) and the control by an application.

(Touch Operation Determining Module 1404)

The touch operation determining module 1404 has a function of determining an area on which a touch operation by the operation medium is performed. For example, based on a touch position of the operation medium detected by the detecting unit 120, the touch operation determining module 1404 determines an area operated by the operation medium.

Specifically, the touch operation determining module 1404 first determines an area where the touch position detected by the detecting unit 120 is included. When the touch position is included in the touch screen area TA, the touch operation determining module 1404 determines that the touch screen area TA has been operated. On the other hand, when the touch position is included in the VPTP area VA, the touch operation determining module 1404 determines that the VPTP area VA has been operated. Then, the touch operation determining module 1404 outputs the determination result to the signal processing module 1406 at the polling rate set by the polling rate setting module 1403.

(Signal Processing Module 1406)

The signal processing module 1406 has a function of generating signals for controlling operations of the OS and outputting the signals to the OS. For example, based on the determination result input from the touch operation determining module 1404, the signal processing module 1406 generates a signal including definition information according to the area where the touch position is detected, and outputs the signal to the OS.

When the determination result indicates that the touch position is detected in the touch screen area TA, the signal processing module 1406 generates a touch screen signal including the definition information of the touch screen 10 and outputs the signal to the OS. As a result, the signal processing module 1406 can cause the OS to recognize that the touch screen 10 is operated as a touch screen and to perform operations related to the touch screen.

On the other hand, when the determination result indicates that the touch position is detected in the VPTP area VA, the signal processing module 1406 generates a VPTP signal including the definition information of the PTP and outputs the signal to the OS. As a result, the signal processing module 1406 can cause the OS to recognize that the touch screen 10 is operated as the PTP and to perform operations related to the PTP.

When setting the normal mode, the touch screen area TA is set for the entire area of the touch panel area. For that reason, no matter where in the touch panel area a touch is detected, the signal processing module 1406 generates the touch screen signal and outputs the signal to the OS.

When setting the VPTP mode, the VPTP area VA is overlaid on a part of the touch screen area TA. For that reason, when a touch is detected in the touch screen area TA, the signal processing module 1406 generates the touch screen signal and outputs the signal to the OS in the same way as when setting the normal mode. On the other hand, when the touch is detected in the VPTP area VA, the signal processing module 1406 generates the VPTP signal and outputs the signal to the OS.

At the time of the generation of the signal, the signal processing module 1406 changes, for example, the definition information included in the signal to change a signal to be output to the OS. Specifically, it is assumed that the touch is detected in the VPTP area VA after the output of the touch screen signal. In this case, the signal processing module 1406 changes the definition information of the touch screen 10 included in the touch screen signal to the definition information of the PTP. As a result, the touch screen signal is changed to the VPTP signal. In this way, the signal processing module 1406 generates the signal indicating that a part of the touch panel area has been touched as the signal indicating that the PTP has been touched.

Note that the touch screen signal and the VPTP signal are generated by the EC firmware for the touch screen 10 and are output to the OS. As a result, the OS operations related to the touch screen 10 are controlled by the EC firmware for the touch screen 10. The touch screen signal and the VPTP signal may be output in accordance with a request from the OS or may be output regardless of the request, if they are output to the OS at the polling rate set by the polling rate setting module 1403.

(5) Storage Unit 150

The storage unit 150 has a function of storing various types of information. The storage unit 150 is configured to include the main memory 16, the BIOS memory 22, the HDD 23, the ROM and RAM included in the EC 31, and the like. The storage unit 150 stores therein, for example, software such as OS and various applications, various firmware such as system firmware and EC firmware, and definition information. As an example, the storage unit 150 according to the first embodiment stores at least one definition information indicating that the screen display on the touch screen 10 is a vertical screen display and the VPTP 9 is displayed in the area where the OSK 7 has been displayed.

4. PROCESSING FLOW

As described above, the functional configuration example of the information processing apparatus 1 according to the first embodiment has been described. Next, an example of processing flow in the information processing apparatus 1 according to the first embodiment will be described with reference to FIGS. 6 to 11.

(1) Processing Flow in Information Processing Apparatus 1

Figure 6:
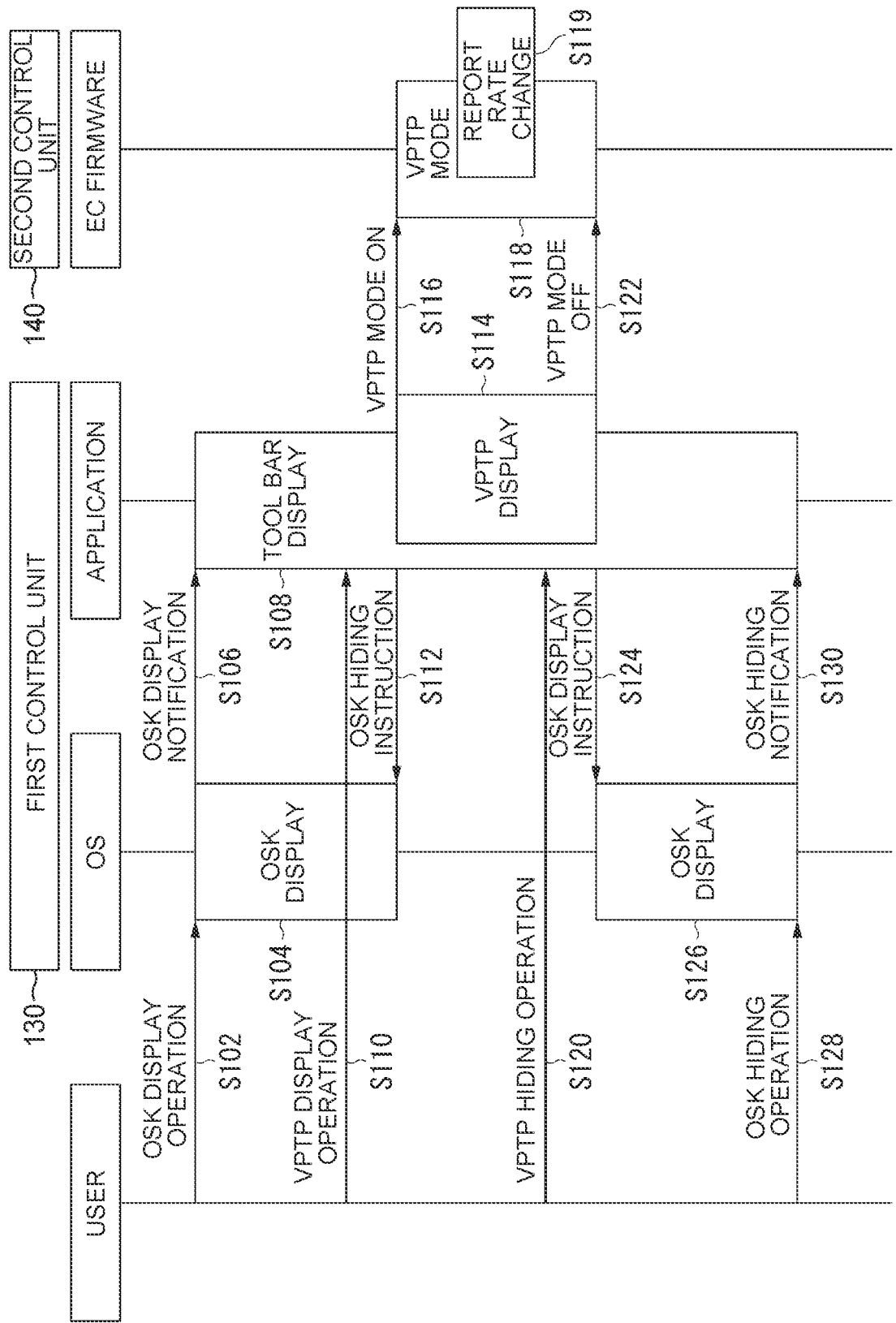
FIG. 6 is a sequence diagram illustrating an example of processing flow in the information processing apparatus according to the first embodiment.

FIG. 6 is a sequence diagram illustrating an example of processing flow in the information processing apparatus 1 according to the first embodiment. Note that, based on operations by the user, processing in each of the OS and application executed by the first control unit 130 of the information processing apparatus 1 and the EC firmware executed by the second control unit 140 will be described below as illustrated in FIG. 6.

(When Inputting OSK 7 Display Operation)

The user first inputs an operation for displaying the OSK 7 into the information processing apparatus 1 (Step S102). This operation is input into the OS through the touch screen 10.

The OS into which the operation is input causes the touch screen 10 to display the OSK 7 (Step S104).

After displaying the OSK 7, the OS outputs a notification indicating that the OSK 7 is displayed to an application (Step S106).

The notified application causes the touch screen 10 to display the tool bar 8 (Step S108).

(When Inputting VPTP 9 Display Operation)

The user first inputs an operation for displaying the VPTP 9 into the information processing apparatus 1 (Step S110). This operation is input into the application through the tool bar 8 displayed on the touch screen 10.

The application into which the operation is input outputs an instruction of hiding the OSK 7 to the OS (Step S112). The OS that has received the instruction causes the touch screen 10 to hide the OSK 7.

Next, the application causes the touch screen 10 to display the VPTP 9 in the area where the OSK 7 has been displayed (Step S114).

Next, the application outputs an instruction of turning on the VPTP mode of the touch screen 10 to the EC firmware (Step S116).

The EC firmware that has received the instruction sets the VPTP mode for the touch screen 10 (Step S118).

Moreover, the EC firmware changes a polling rate in an area where the VPTP area VA is set (Step S119). Specifically, when the VPTP area VA is set in the touch panel area, the EC firmware raises the polling rate in the area where the VPTP area VA is set from 120 Hz to 125 Hz. On the other hand, when the setting of the VPTP area VA in the touch panel area is canceled, the EC firmware lowers (i.e., restores) the polling rate in the area where the VPTP area VA is set from 125 Hz to 120 Hz.

(When Inputting VPTP 9 Hiding Operation)

The user first inputs an operation for hiding the VPTP 9 into the information processing apparatus 1 (Step S120). This operation is input into the application through the tool bar 8 displayed on the touch screen 10.

The application into which the operation is input outputs an instruction of turning off the VPTP mode of the touch screen 10 to the EC firmware, and causes the touch screen 10 to hide the VPTP 9 (Step S122).

The EC firmware that has received the instruction turns off the VPTP mode. Next, the application outputs an instruction of displaying the OSK 7 to the OS (Step S124).

The OS that has received the instruction causes the touch screen 10 to display the OSK 7 (Step S126).

(When Inputting OSK 7 Hiding Operation)

The user first inputs an operation for hiding the OSK 7 into the information processing apparatus 1 (Step S128). This operation is input into the OS through the touch screen 10. The OS into which the operation is input causes the touch screen 10 to hide the OSK 7.

Furthermore, the OS outputs a notification indicating that the OSK 7 is hidden to the application (Step S130). The notified application causes the touch screen 10 to hide the tool bar 8.

(2) Transition of Display and Function

Herein, an example of transition of the display and function on the touch screen 10 will be described with reference to FIGS. 7 to 10.

(At Initial Display)

Figure 7:
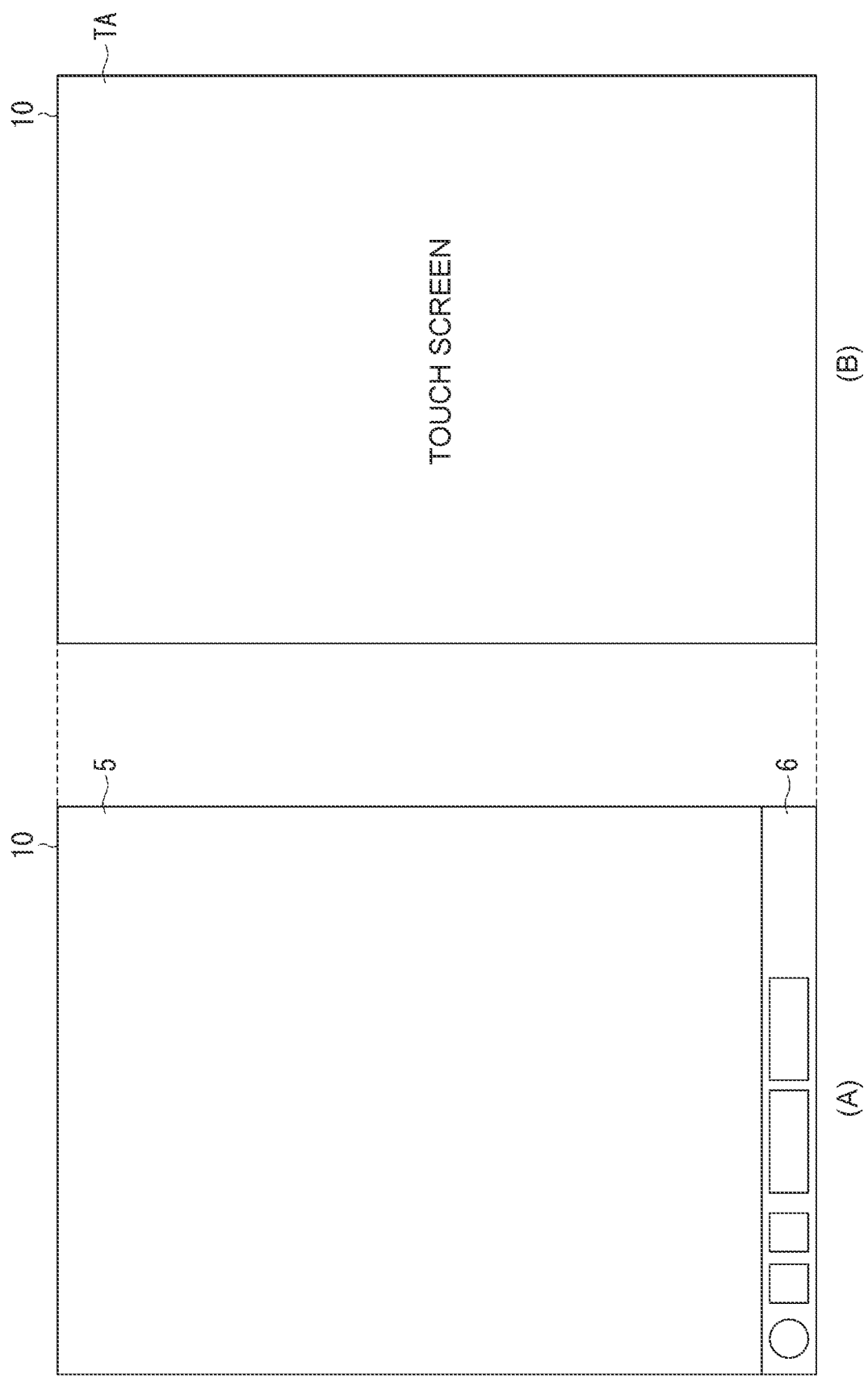
FIG. 7 is a diagram illustrating an example of the display and function of the touch screen at the time of the initial display according to the first embodiment.

FIG. 7 is a diagram illustrating an example of the display and function of the touch screen 10 at the time of the initial display according to the first embodiment. The left drawing (A) of FIG. 7 illustrates a display example, and the right drawing (B) of FIG. 7 illustrates a function example. At the time of the initial display (before execution of Step S102), for example, the desktop 5 and a task bar 6 are displayed on the touch screen 10 as illustrated in (A) of FIG. 7. At this time, as illustrated in (B) of FIG. 7, the touch screen area TA is set for the entire area of the touch screen 10 (touch panel area), and the touch screen area TA functions as a touch screen.

(When Displaying OSK 7)

Figure 8:
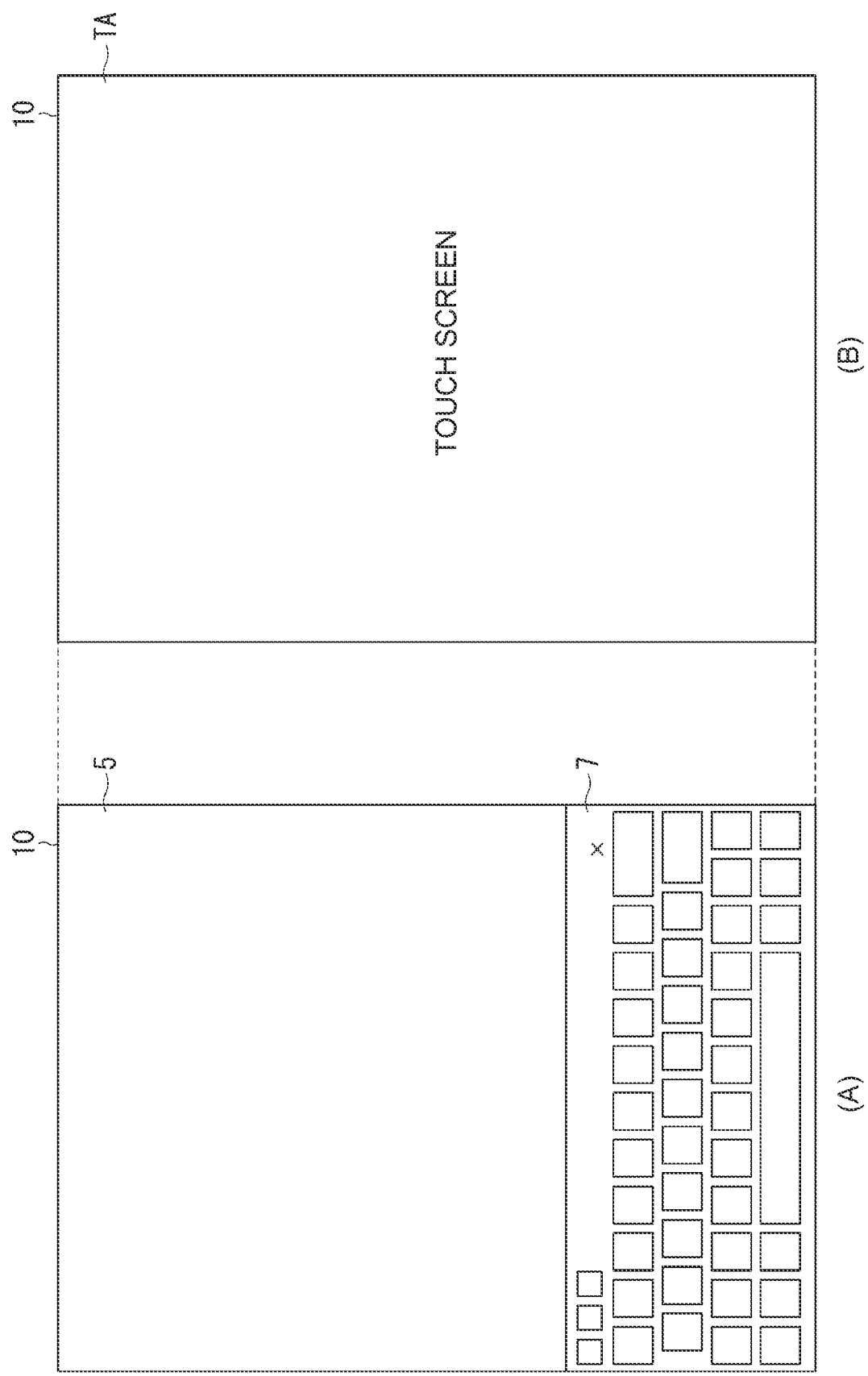
FIG. 8 is a diagram illustrating an example of the display and function of the touch screen at the time of the display of a screen keyboard according to the first embodiment.

FIG. 8 is a diagram illustrating an example of the display and function of the touch screen 10 at the time of the display of the OSK 7 according to the first embodiment. The left drawing (A) of FIG. 8 illustrates a display example, and the right drawing (B) of FIG. 8 illustrates a function example. When displaying the OSK 7 (when executing Step S104 to Step S106), for example, the desktop 5 and the OSK 7 are displayed on the touch screen 10 as illustrated in (A) of FIG. 8. At this time, as illustrated in (B) of FIG. 8, the touch screen area TA is set for the entire area of the touch screen 10, and the touch screen area TA functions as a touch screen.

(When Displaying Tool Bar 8)

Figure 9:
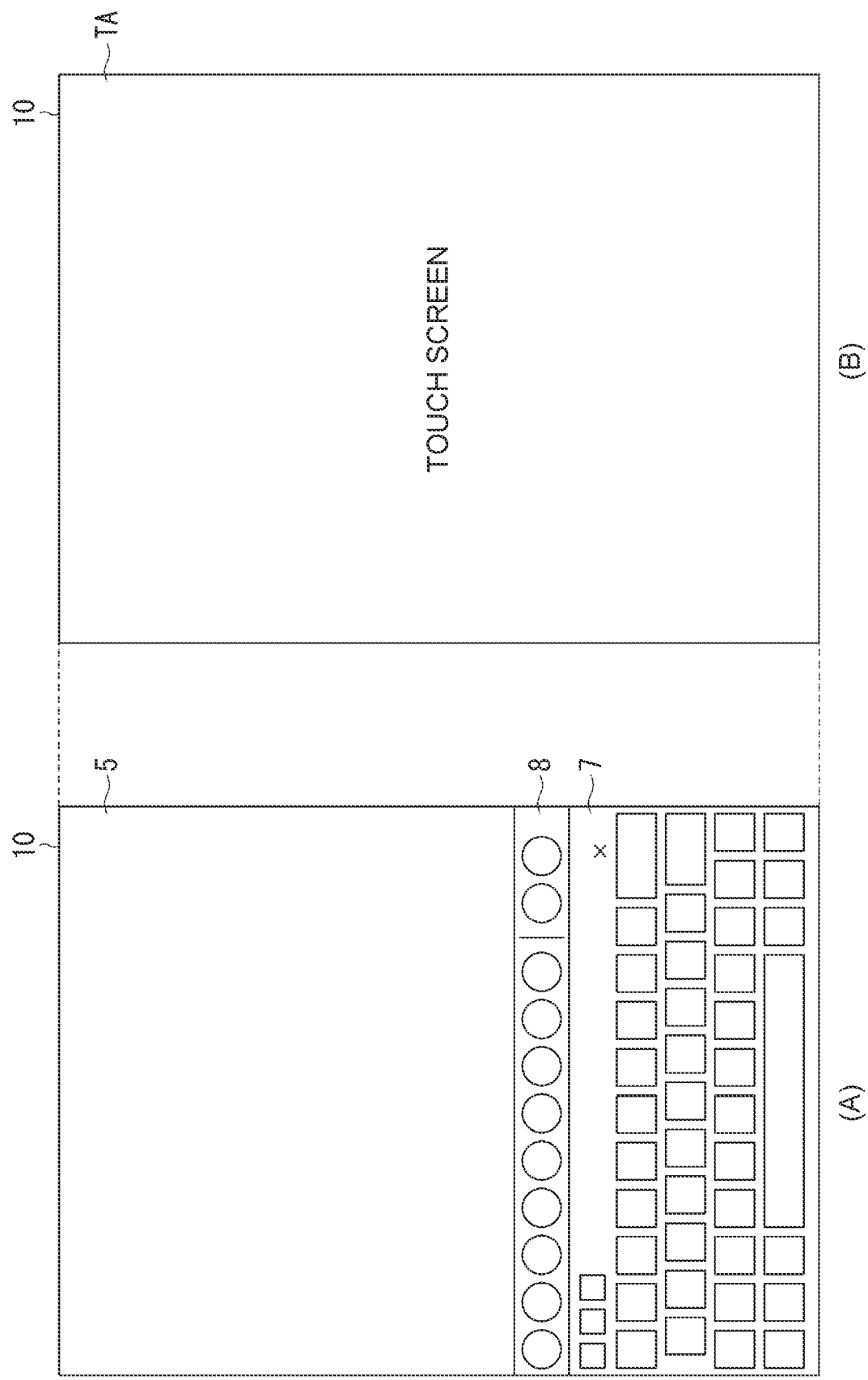
FIG. 9 is a diagram illustrating an example of the display and function of the touch screen at the time of the display of a tool bar according to the first embodiment.

FIG. 9 is a diagram illustrating an example of the display and function of the touch screen 10 at the time of the display of the tool bar 8 according to the first embodiment. The left drawing (A) of FIG. 9 illustrates a display example, and the right drawing (B) of FIG. 9 illustrates a function example. When displaying the tool bar 8 (when executing Step S108 to Step S112 and Step S124 to Step S130), for example, the desktop 5, the OSK 7, and the tool bar 8 are displayed on the touch screen 10 as illustrated in (A) of FIG. 9. At this time, as illustrated in (B) of FIG. 9, the touch screen area TA is set for the entire area of the touch screen 10, and the touch screen area TA functions as a touch screen.

(When Displaying VPTP 9)

Figure 10:
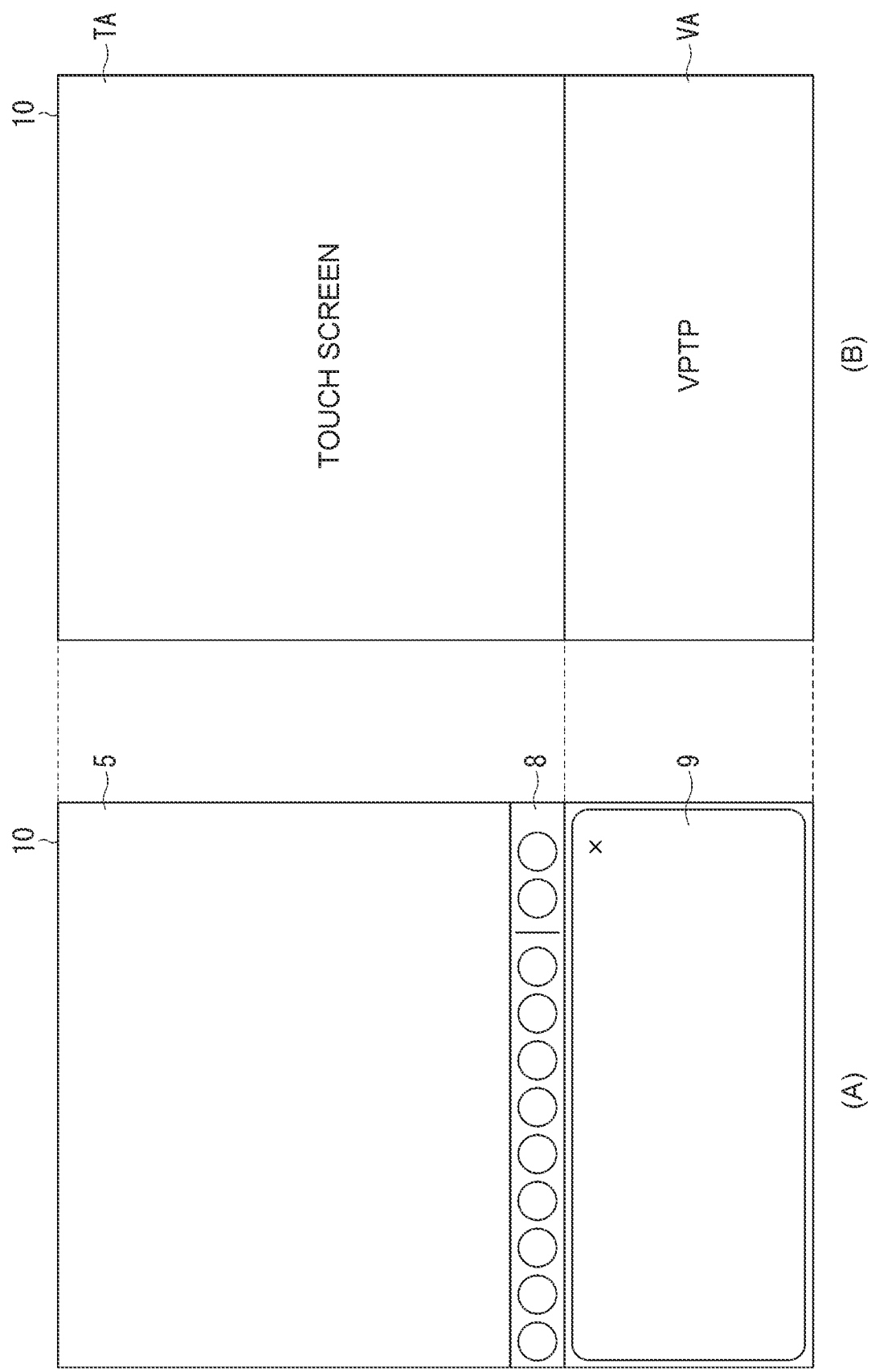
FIG. 10 is a diagram illustrating an example of the display and function of the touch screen at the time of the display of a virtual precision touch pad according to the first embodiment.

FIG. 10 is a diagram illustrating an example of the display and function of the touch screen 10 at the time of the display of the VPTP 9 according to the first embodiment. The left drawing (A) of FIG. 10 illustrates a display example, and the right drawing (B) of FIG. 10 illustrates a function example. When displaying the VPTP 9 (when executing Step S114 to Step S122), for example, the desktop 5, the tool bar 8, and the VPTP 9 are displayed on the touch screen 10 as illustrated in (A) of FIG. 10. At this time, as illustrated in (B) of FIG. 10, the touch screen area TA is set for an area where the desktop 5 and the tool bar 8 of the touch screen 10 are displayed, and the touch screen area TA functions as a touch screen. Moreover, the VPTP area VA is displayed in an area where the VPTP 9 of the touch screen 10 is displayed, and the VPTP area VA functions as the PTP.

(3) Processing Flow in Second Control Unit 140

Figure 11:
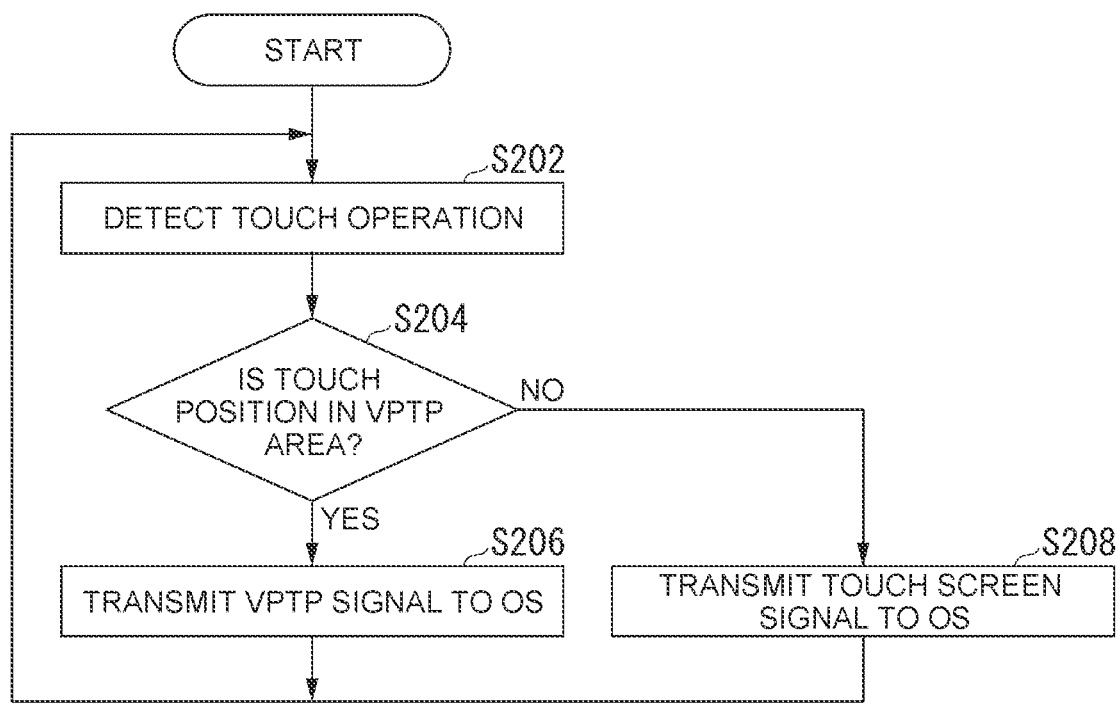
FIG. 11 is a flowchart illustrating an example of processing flow in a second control unit according to the first embodiment.

FIG. 11 is a flowchart illustrating an example of processing flow in the second control unit 140 according to the first embodiment. As illustrated in FIG. 11, the second control unit 140 first detects a touch operation by an operation medium on the display unit 110 (Step S202).

Next, the second control unit 140 determines whether a touch position of the detected touch operation is in the VPTP area VA (Step S204).

When the touch position is in the VPTP area VA (Step S204: YES), the second control unit 140 causes the EC firmware to transmit the VPTP signal to the OS (Step S206). On the other hand, when the touch position is not in the VPTP area VA (Step S204: NO), the second control unit 140 causes the EC firmware to transmit the touch screen signal to the OS (Step S208). After transmitting the signal, the second control unit 140 repeatedly performs the above processing every time a touch operation is detected.

As described above, the information processing apparatus 1 according to the first embodiment includes the display unit 110, the touch panel 12 (the detecting unit 120), the function setting module 1402, and the polling rate setting module 1403.

The touch panel 12 detects the touch position at which the touch operation is performed on the display unit 110.

The function setting module 1402 sets at least one area of the touch screen area TA and the VPTP area VA with respect to the touch panel area where the touch panel 12 is formed.

When the VPTP area VA is set for the touch panel area, the polling rate setting module 1403 raises the polling rate in the area where the VPTP area VA is set in the touch panel area.

By employing this configuration, the user can perform a finer touch operation in the VPTP area VA than that in the touch screen area TA. As a result, a user experience on the touch screen 10 is also improved.

Therefore, the information processing apparatus 1 can improve a user experience on the touch screen 10 by increasing the polling rate in the VPTP area VA.

5. MODIFIED EXAMPLES

As described above, the first embodiment has been described. Next, modified examples of the first embodiment will be described. Note that each modified example to be described later may be alone applied to the first embodiment or may be applied to the first embodiment in combination. Moreover, each modified example may be applied instead of the configuration described in the first embodiment or may be additionally applied to the configuration described in the first embodiment.

(1) First Modified Example

First, the first modified example according to the first embodiment will be described with reference to FIG. 12. FIG. 12 is a diagram illustrating an example of the display and function of the touch screen 10 according to the first modified example of the first embodiment. The left drawing (A) of FIG. 12 illustrates a display example, and the right drawing (B) of FIG. 12 illustrates a function example.

In the embodiment described above, the example in which the VPTP 9 may be overlaid on the OSK 7 has been described, but the display processing module 1302 may display the VPTP 9 without being overlaid on the OSK 7.

For example, as illustrated in (A) of FIG. 12, the desktop 5, the OSK 7, the tool bar 8, and the VPTP 9 are displayed on the touch screen 10. Furthermore, the VPTP 9 is displayed in an area different from that of the OSK 7 without being overlaid on the OSK 7. At this time, as illustrated in (B) of FIG. 12, the touch screen area TA is set in an area where the desktop 5, the OSK 7, and the tool bar 8 of the touch screen 10 are displayed, and the touch screen area TA functions as a touch screen. Moreover, the VPTP area VA is displayed in an area where the VPTP 9 of the touch screen 10 is displayed, and the VPTP area VA functions as the PTP.

As a result, because both the OSK 7 and the VPTP 9 are displayed on the touch screen 10, the user can save a trouble of switching the display when using the OSK 7 or the VPTP 9. Therefore, the information processing apparatus 1 can improve a user experience on the touch screen. Note that, when implementing the present modified example, the storage unit 150 stores therein definition information that includes display layout information indicating display layout of (A) of FIG. 12 and area setting information indicating area setting of (B) of FIG. 12.

(2) Second Modified Example

Figure 13:
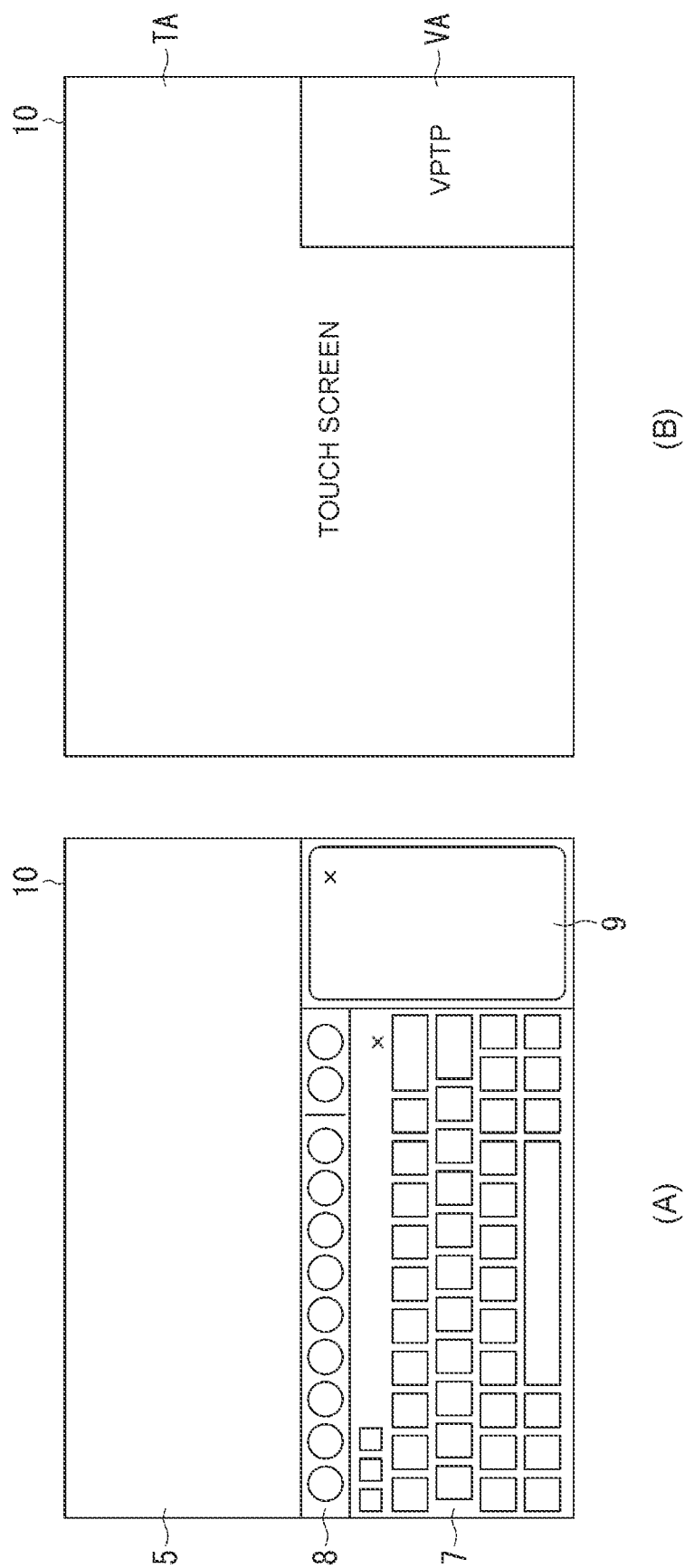
FIG. 13 is a diagram illustrating an example of the display and function of the touch screen according to a second modified example of the first embodiment.

Next, the second modified example according to the first embodiment will be described with reference to FIG. 13. FIG. 13 is a diagram illustrating an example of the display and function of the touch screen 10 according to the second modified example of the first embodiment. The left drawing (A) of FIG. 13 illustrates a display example, and the right drawing (B) of FIG. 13 illustrates a function example.

In the embodiment described above, the example in which the screen display on the touch screen 10 is vertical screen display has been described, but the embodiment is not limited to such the example. For example, the screen display on the touch screen 10 may be horizontal screen display in which one of two long sides constituting the touch screen 10 is in a top direction of the screen display and the other is in a bottom direction of the screen display.

When the screen display is horizontal screen display, as illustrated in (A) of FIG. 13, for example, the desktop 5, the OSK 7, the tool bar 8, and the VPTP 9 are displayed on the touch screen 10. At this time, as illustrated in (B) of FIG. 13, the touch screen area TA is set in an area where the desktop 5, the OSK 7, and the tool bar 8 of the touch screen 10 are displayed, and the touch screen area TA functions as a touch screen. Moreover, the VPTP area VA is displayed in an area where the VPTP 9 of the touch screen 10 is displayed, and the VPTP area VA functions as the PTP.

As a result, the touch screen 10 can display the VPTP 9 even in the horizontal screen display. The user can use the VPTP 9 even if the information processing apparatus 1 is held to have the horizontal screen display. Therefore, the information processing apparatus 1 can improve a user experience on the touch screen. Note that, when implementing the present modified example, the storage unit 150 stores therein definition information that includes display layout information indicating display layout of (A) of FIG. 13 and area setting information indicating area setting of (B) of FIG. 13.

(3) Third Modified Example

Next, the third modified example will be described. In the embodiment described above, the example in which the storage unit 150 stores one piece of definition information has been described, but the embodiment is not limited to such the example. For example, the storage unit 150 may store a plurality of pieces of definition information. As an example, the plurality of pieces of definition information includes a plurality of pieces of definition information, in which display layouts are different, such as definition information for realizing the display and function illustrated in FIG. 2, definition information for realizing the display and function illustrated in FIG. 12, and definition information for realizing the display and function illustrated in FIG. 13.

As a result, the information processing apparatus 1 can cause the touch screen 10 to perform various displays according to situations. For example, it is assumed that the storage unit 150 stores definition information related to vertical screen display and definition information related to horizontal screen display. At this time, when the user holds and operates the information processing apparatus 1 so that one of two short sides constituting the touch screen 10 is in the top direction of the screen display and the other is in the bottom direction of the screen display, the screen display of the touch screen 10 becomes vertical screen display. From this state, when the user rotates the information processing apparatus 1 so that one of two long sides constituting the touch screen 10 is in the top direction of the screen display and the other is in the bottom direction of the screen display, the screen display of the touch screen 10 is changed to horizontal screen display.

Moreover, the plurality of pieces of definition information may be a plurality of pieces of definition information that have different hardware information of PTP. As a result, the information processing apparatus 1 can cause the touch screen 10 to display the VPTP 9 of various standards.

As described above, the touch screen 10 can display the VPTP 9 according to the orientation of the information processing apparatus 1 by the storage unit 150 storing the plurality of pieces of definition information, and the user can use the VPTP 9 regardless of the orientation of the information processing apparatus 1. Moreover, the touch screen 10 can display the VPTP 9 of various standards, and the user can select and use the VPTP 9 suited for oneself. Therefore, the information processing apparatus 1 can improve a user experience on the touch screen.

2. Second Embodiment

Next, the second embodiment will be described with reference to FIGS. 14 to 17.

In the above first embodiment, the example in which the VPTP 9 is displayed at the preset position has been described, but the first embodiment is not limited to such the example. The VPTP 9 may be displayed at a position according to a mode (hereinafter, also referred to as "use mode") in which the user is using the information processing apparatus 1, for example. Hereinafter, in the second embodiment, an example in which the VPTP 9 is displayed at a position according to a use mode will be described. Note that the description overlapping with the first embodiment described above will be omitted.

Figure 14:
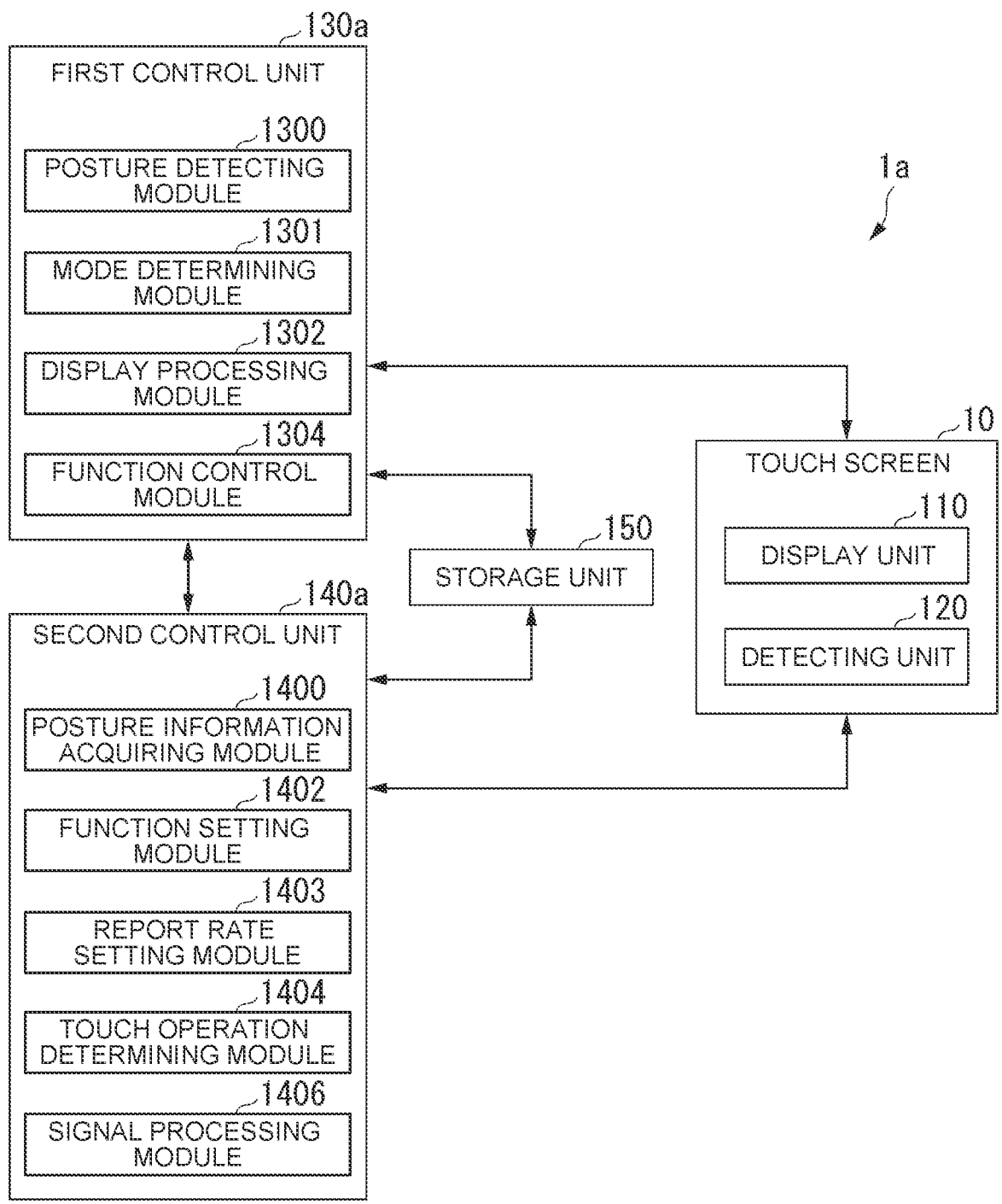
FIG. 14 is a block diagram illustrating a functional configuration example of an information processing apparatus according to a second embodiment.

FIG. 14 is a block diagram illustrating a functional configuration example of an information processing apparatus 1a according to the second embodiment. Note that, because the hardware configuration of the information processing apparatus 1a according to the second embodiment is the same as that of the information processing apparatus 1 described with reference to FIGS. 1 and 4, their descriptions are omitted. Moreover, the functional configuration of the information processing apparatus 1a having the same functional configuration as that of the information processing apparatus 1 described with reference to FIG. 5 is assigned with the same reference numbers, and their descriptions are omitted. In the second embodiment, the functional configuration different from that of the first embodiment will be described.

As illustrated in FIG. 14, a first control unit 130*a* of the information processing apparatus 1*a* further includes a posture detecting module 1300 and a mode determining module 1301, in addition to the configuration included in the first control unit 130 of the information processing apparatus 1 described with reference to FIG. 5 in the first embodiment.

(Posture Detecting Module 1300)

The posture detecting module 1300 has a function of detecting a posture of the information processing apparatus 1*a* (apparatus itself). For example, based on posture information related to a posture of the information processing apparatus 1*a* acquired by the sensor device 34, the posture detecting module 1300 detects the posture of the information processing apparatus 1*a*. Specifically, the posture detecting module 1300 detects, from the posture information, a posture of the information processing apparatus 1*a* when the information processing apparatus 1*a* is held like when the user reads a book, a posture of the information processing apparatus 1*a* when the information processing apparatus 1*a* is placed like when the user uses a laptop PC, or the like.

(Mode Determining Module 1301)

The mode determining module 1301 has a function of determining a use mode of the information processing apparatus 1*a*. For example, based on the posture of the information processing apparatus 1*a* detected by the posture detecting module 1300, the mode determining module 1301 determines a use mode of the information processing apparatus 1*a*. As an example, when a posture in which the information processing apparatus 1*a* is held like when the user reads a book is detected by the posture detecting module 1300, the mode determining module 1301 determines that the use mode is a mode (hereinafter, also referred to as "book mode") of using the information processing apparatus 1*a* like a book. Moreover, when a posture in which the information processing apparatus 1*a* is placed like when the user uses a laptop PC is detected by the posture detecting module 1300, the mode determining module 1301 determines that the use mode is a mode (hereinafter, also referred to as "clamshell mode") of using the information processing apparatus 1*a* like a laptop PC.

The display processing module 1302 displays the VPTP 9 at a position in the touch panel area according to the use mode determined by the mode determining module 1301.

Note that the display processing module 1302 may display the VPTP 9 at a position previously set for each use mode or may display the VPTP 9 at a position determined based on information acquired by the sensor device 34 in accordance with a use mode. For example, the display processing module 1302 detects the position of a finger of the user from the information acquired by the sensor device 34, and displays the VPTP 9 near the position of this finger. Moreover, the number, size, position, etc. of the VPTP 9 displayed by the display processing module 1302 are not particularly limited.

Herein, a display example of the VPTP 9 according to the second embodiment will be described with reference to FIGS. 15 and 16.

Figure 15:
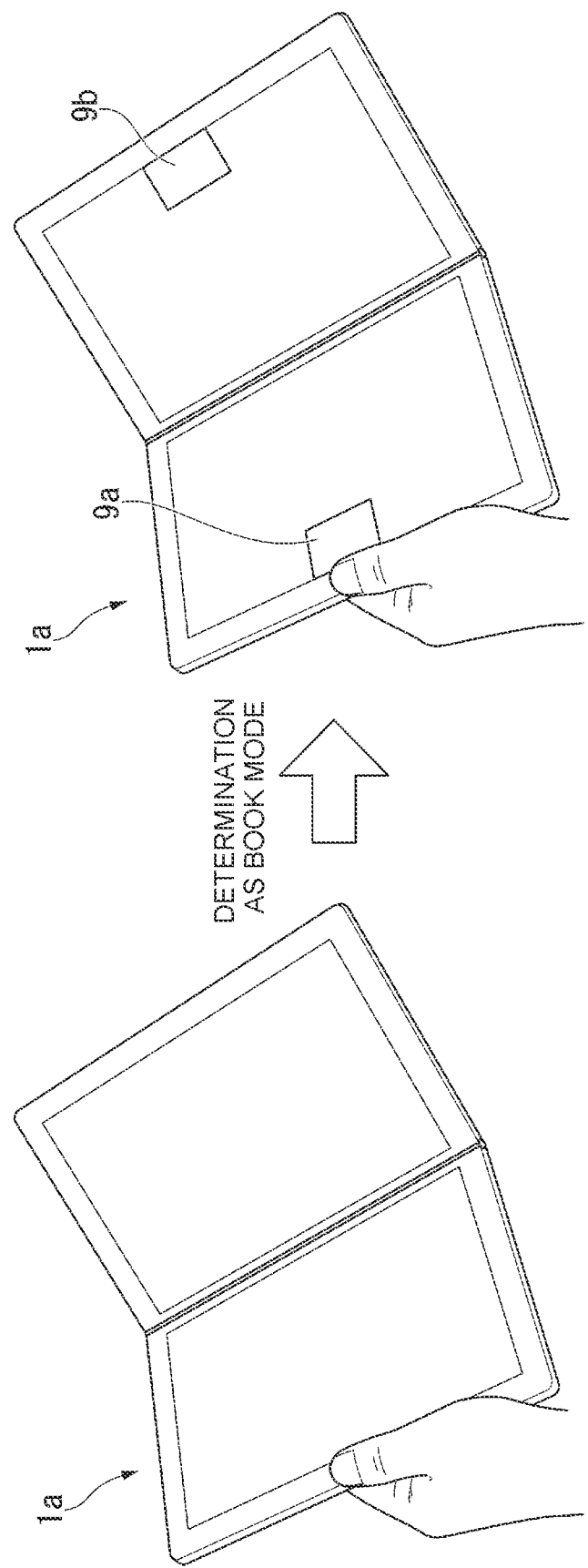
FIG. 15 is a diagram illustrating a display example of a virtual precision touch pad in a book mode according to the second embodiment.

FIG. 15 is a diagram illustrating a display example of the VPTP 9 in a book mode according to the second embodiment. As illustrated in the left drawing of FIG. 15, it is assumed that the user is using the information processing apparatus 1*a* in a state where it is held in a hand. In this case, the mode determining module 1301 determines that the use mode is a book mode. Because it is determined that the use mode is a book mode, the display processing module 1302 displays a VPTP 9*a* and a VPTP 9*b* as illustrated in the right drawing of FIG. 15. The positions at which the VPTP 9*a* and the VPTP 9*b* are displayed are, for example, preset positions as a position near a thumb of the user. By displaying the VPTPs 9*a* and 9*b* at the positions, the user can easily perform an operation (e.g., page turning) when the information processing apparatus 1*a* is held like when the user reads a book.

Figure 16:
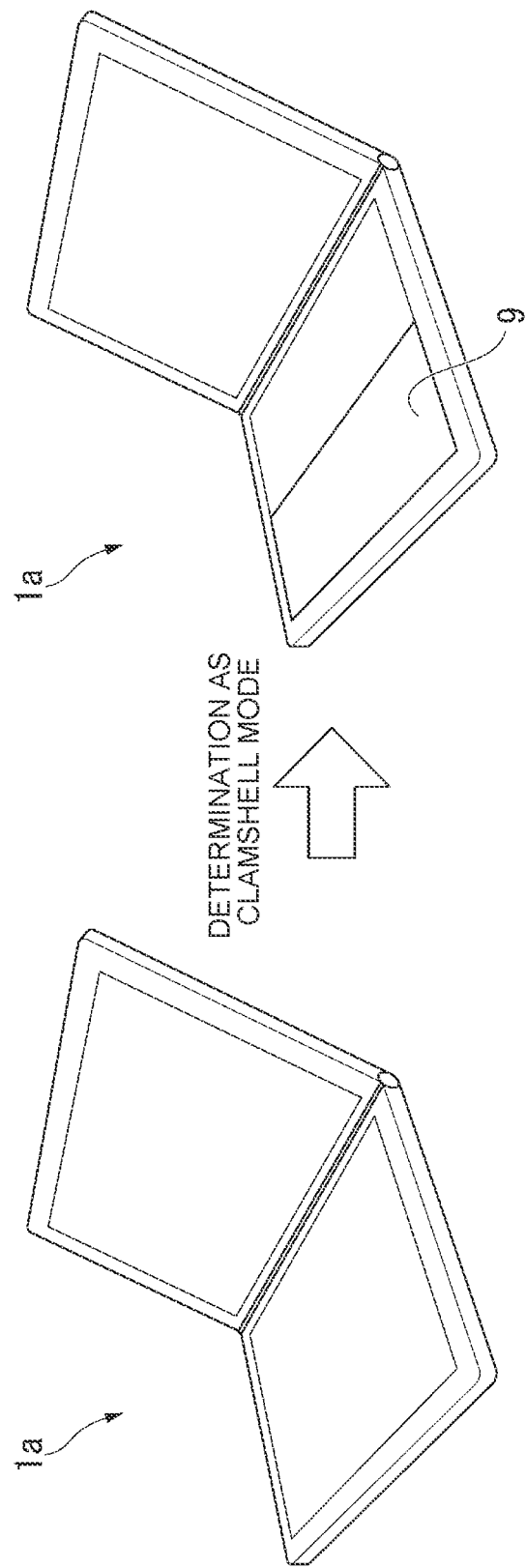
FIG. 16 is a diagram illustrating a display example of the virtual precision touch pad in a clamshell mode according to the second embodiment.

FIG. 16 is a diagram illustrating a display example of the VPTP 9 in a clamshell mode according to the second embodiment. As illustrated in the left drawing of FIG. 16, it is assumed that the user is using the information processing apparatus 1*a* in a state where it is opened and placed. In this case, the mode determining module 1301 determines that the use mode is a clamshell mode. Because it is determined that the use mode is a clamshell mode, the display processing module 1302 displays the VPTP 9 as illustrated in the right drawing of FIG. 16. A position at which the VPTP 9 is displayed is, for example, a preset position as a position at which the user easily performs a touch operation.

Moreover, as illustrated in FIG. 14, a second control unit 140*a* of the information processing apparatus 1*a* further includes a posture information acquiring module 1400 in addition to the configuration included in the second control unit 140 of the information processing apparatus 1 described with reference to FIG. 5 in the first embodiment.

(Posture Information Acquiring Module 1400)

The posture information acquiring module 1400 has a function of acquiring posture information. For example, the posture information acquiring module 1400 acquires the posture information from the sensor device 34. The posture information acquiring module 1400 outputs the acquired posture information to the posture detecting module 1300.

Figure 17:
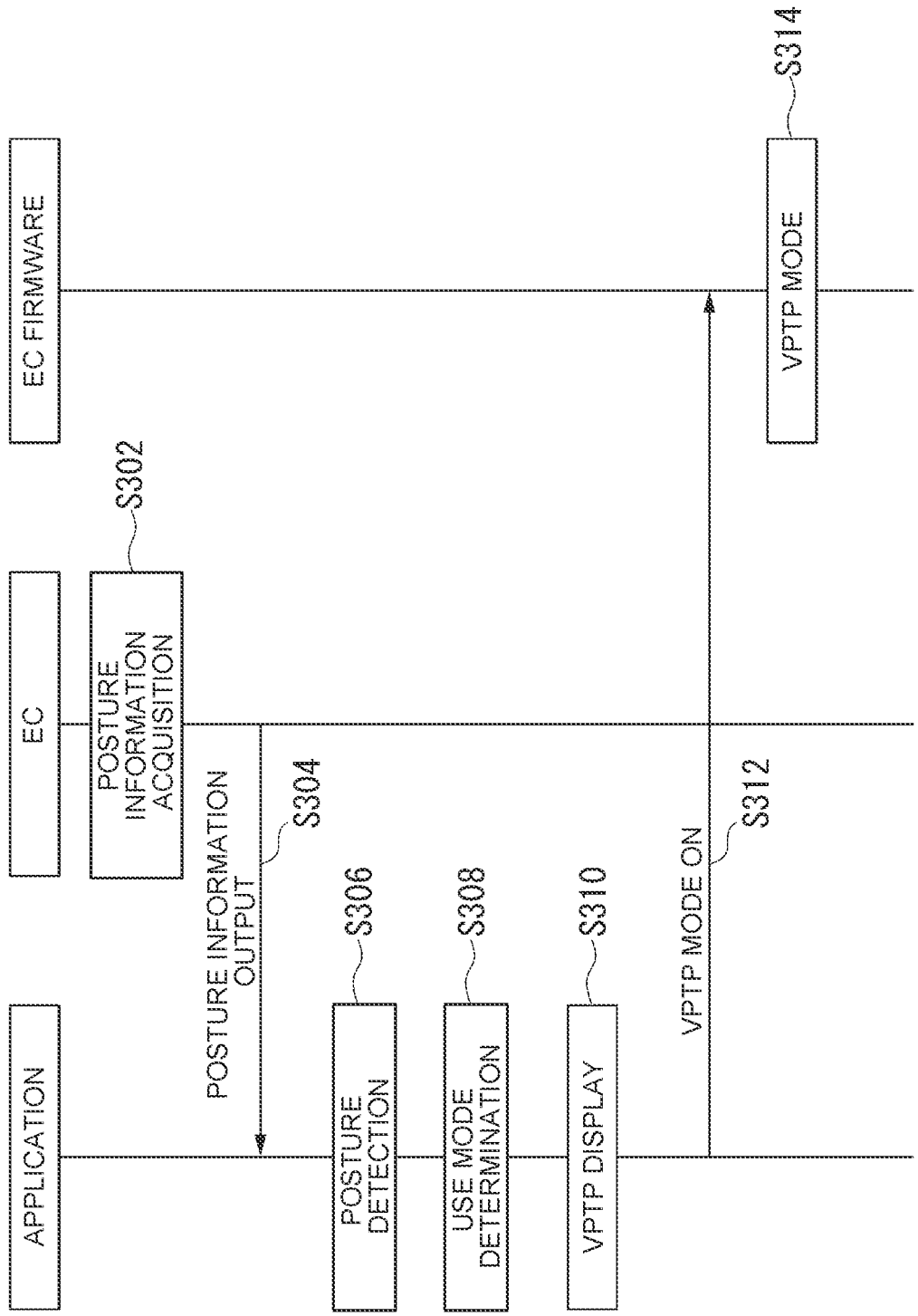
FIG. 17 is a sequence diagram illustrating a flow example of display processing of the virtual precision touch pad according to the second embodiment.

Herein, a flow of display processing of the VPTP 9 will be described with reference to FIG. 17. FIG. 17 is a sequence diagram illustrating a flow example of display processing of the VPTP 9 according to the second embodiment.

As illustrated in FIG. 17, the EC (the posture information acquiring module 1400) first acquires the posture information from the sensor device 34 (Step S302). The EC outputs the acquired posture information to an application (Step S304).

Based on the posture information input from the EC, the application (the posture detecting module 1300) detects a posture of the information processing apparatus 1*a* (Step S306).

Based on the detected posture of the information processing apparatus 1*a*, the application (the mode determining module 1301) determines a use mode of the information processing apparatus 1*a* (Step S308).

The application (the display processing module 1302) displays the VPTP at a position according to the determined use mode (Step S310).

The application (the function control module 1304) outputs an instruction of turning on the VPTP mode of the touch screen 10 to the EC firmware (Step S312).

The EC firmware that has received the instruction sets the VPTP mode for the touch screen 10 (Step S314).

As described above, the information processing apparatus 1*a* according to the second embodiment detects the posture of the information processing apparatus 1*a* based on the posture information by the posture detecting module 1300, determines the use mode of the information processing apparatus 1*a* from the detected posture by the mode determining module 1301, and displays the VPTP 9 in accordance with the determined use mode by the display processing module 1302.

By employing this configuration, in the information processing apparatus 1*a*, the VPTP 9 is displayed at the position according to the use mode of the information processing apparatus 1*a*. The user can comfortably perform a touch operation in any use mode by previously performing setting to display the VPTP 9 at the position at which the touch operation according to the use mode is easily performed.

Therefore, the information processing apparatus 1*a* can improve a user experience on the touch screen 10.

3. Third Embodiment

Next, the third embodiment will be described with reference to FIGS. 18 and 19.

In the above first and second embodiments, distinction between a touch operation that executes processing and a touch operation that does not execute processing has not been mentioned, but this distinction may be performed. By distinguishing between a touch operation that executes processing and a touch operation that does not execute processing, it is possible not to recognize an unintended touch operation by a user as a touch operation (exclusion of unintended touch operation) and to detect a button press, for example.

Hereinafter, in the third embodiment, an example of distinguishing between the touch operation that executes processing and the touch operation that does not execute processing will be described. Note that the description overlapping with the first and second embodiments described above will be omitted.

Figure 18:
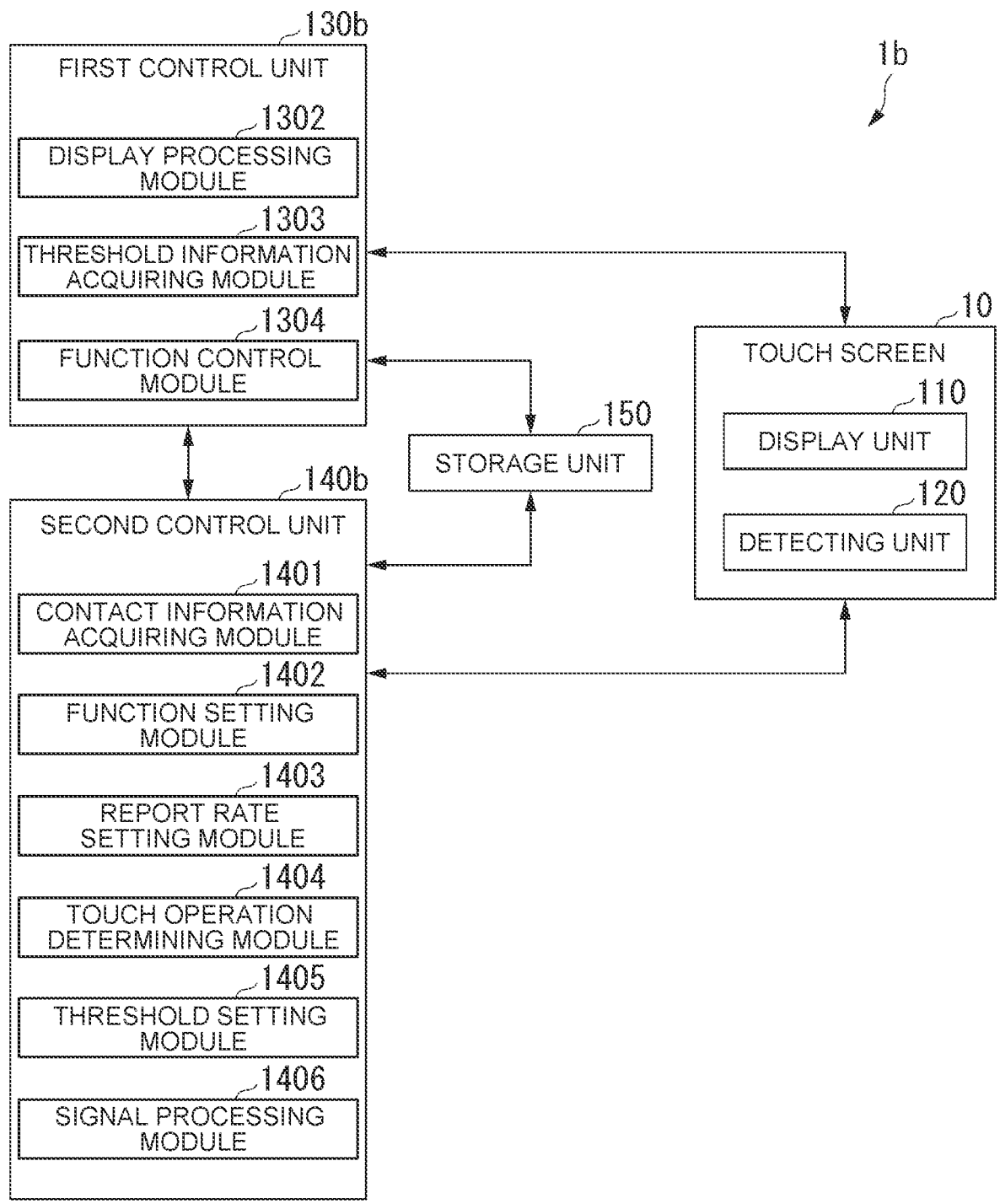
FIG. 18 is a block diagram illustrating a functional configuration example of an information processing apparatus according to a third embodiment.

FIG. 18 is a block diagram illustrating a functional configuration example of an information processing apparatus 1*b* according to the third embodiment. Note that, because a hardware configuration of the information processing apparatus 1*b* according to the third embodiment is the same as the hardware configuration of the information processing apparatus 1 described with reference to FIGS. 1 and 4, their descriptions are omitted. Moreover, the functional configuration of the information processing apparatus 1*b* having the same functional configuration as that of the information processing apparatus 1 described with reference to FIG. 5 is assigned with the same reference numbers, and their descriptions are omitted. In the third embodiment, the functional configuration different from that of the first embodiment will be described.

As illustrated in FIG. 18, a first control unit 130*b* of the information processing apparatus 1*b* further includes a threshold information acquiring module 1303 in addition to the configuration included in the first control unit 130 of the information processing apparatus 1 described with reference to FIG. 5 in the first embodiment.

(Threshold Information Acquiring Module 1303)

The threshold information acquiring module 1303 has a function of acquiring threshold information. The threshold information is information indicating a threshold as a reference when determining whether a touch operation is an operation on which a process should be performed. In the third embodiment, based on a magnitude relationship of contact information with respect to the threshold, it is determined whether a touch operation is an operation on which a process should be performed.

The contact information is information related to contact between an operation medium and the touch panel 12, which is acquired when a touch operation by the operation medium is performed. Specifically, the contact information is information such as a contact area between the operation medium and the touch panel 12 and a pressure applied to the touch panel 12 when the operation medium and the touch panel 12 have contact with each other. The contact information, such as a contact area and a pressure, is detected by the detecting unit 120, for example.

The threshold information is determined by the user, for example. The user determines, for example, a threshold for excluding an unintended touch operation, a threshold for detecting a button press, and the like for each contact information. The user inputs threshold information indicating the determined thresholds through the input unit 32. The threshold information acquiring module 1303 acquires the threshold information input into the input unit 32 and outputs the information to a threshold setting module 1405 to be described later.

As illustrated in FIG. 18, a second control unit 140*b* of the information processing apparatus 1*b* further includes a contact information acquiring module 1401 and the threshold setting module 1405, in addition to the configuration included in the second control unit 140 of the information processing apparatus 1 described with reference to FIG. 5 in the first embodiment.

(Contact Information Acquiring Module 1401)

The contact information acquiring module 1401 has a function of acquiring contact information. For example, the contact information acquiring module 1401 acquires the contact information from the detecting unit 120, and outputs the acquired contact information to the touch operation determining module 1404.

Based on a magnitude relationship with respect to the threshold of the contact information acquired by the contact information acquiring module 1401, the touch operation determining module 1404 determines whether a touch operation is an operation on which a process should be performed. For example, when a contact area when the touch operation is performed is a threshold or more or a contact pressure is a threshold or more, the touch operation determining module 1404 determines that the process by the touch operation is executed. On the other hand, when a contact area when a touch operation is performed is less than the threshold or a contact pressure is less than the threshold, the touch operation determining module 1404 determines that the process by the touch operation is not executed.

As a result, the touch operation determining module 1404 can exclude an unintended touch operation by the user from a process execution target and can detect a button press.

(Threshold Setting Module 1405)

The threshold setting module 1405 has a function of setting a threshold. For example, the threshold setting module 1405 sets threshold information indicating a threshold for excluding an unintended touch operation, threshold information indicating a threshold for detecting a button press, and the like, which are input from the threshold information acquiring module 1303, as thresholds in the VPTP area VA.

Specifically, when the VPTP area VA is set for the touch panel area, the threshold setting module 1405 changes a threshold in an area where the VPTP area VA is set in the touch panel area to a value different from a threshold in another area in the touch panel area. On the other hand, when the setting of the VPTP area VA is canceled, the threshold setting module 1405 restores the threshold in the area where the VPTP area VA is set in the touch panel area.

Note that the determination using the threshold in the VPTP area VA cannot be realized by the control by software such as the OS and various applications. However, in the present invention, the determination using the threshold in the VPTP area VA is made to be feasible by linking the control by firmware (EC firmware) and the control by the application.

Herein, a flow of threshold setting processing will be described with reference to FIG. 19. FIG. 19 is a sequence diagram illustrating a flow example of threshold setting processing according to the third embodiment.

Figure 19:
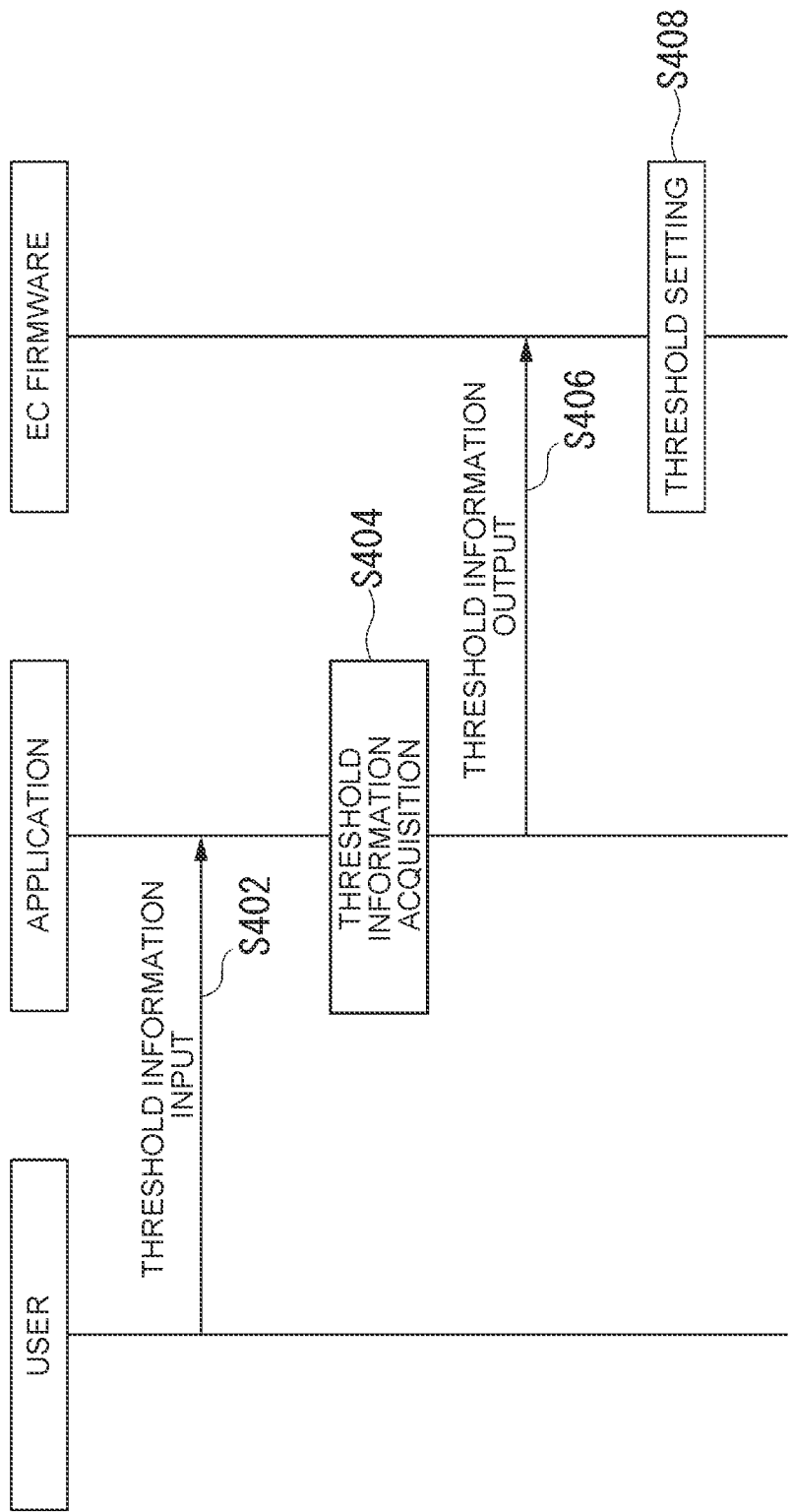
FIG. 19 is a sequence diagram illustrating a flow example of threshold setting processing according to the third embodiment.

As illustrated in FIG. 19, the user first inputs threshold information to be set from the input unit 32 (Step S402).

The application (the threshold information acquiring module 1303) acquires the threshold information input by the user (Step S404). The application (the threshold information acquiring module 1303) outputs the acquired threshold information to the EC firmware (Step S406).

Based on the threshold information input from the application, the EC firmware (the threshold setting module 1405) sets a threshold in the VPTP area VA (Step S408).

As described above, in the information processing apparatus 1b according to the third embodiment, when the VPTP area VA is set for the touch panel area, the threshold setting module 1405 changes the threshold in the area where the VPTP area VA is set in the touch panel area to the value different from the threshold in the other area in the touch panel area. Moreover, based on the magnitude relationship of contact information with respect to the threshold acquired when the touch operation by the operation medium is performed, the touch operation determining module 1404 determines whether the touch operation is an operation on which the process should be performed.

By employing this configuration, based on the magnitude relationship between the contact information and the threshold in the VPTP area VA, distinction between a touch operation that executes processing and a touch operation that does not execute processing is performed in the VPTP area VA. As a result, the determination accuracy of the touch operation in the VPTP area VA is improved, and the operability is improved.

Therefore, the information processing apparatus 1b can improve a user experience on the touch screen 10.

As described above, the embodiments of the present invention have been described. Note that the embodiments described above may be alone implemented or may be implemented in combination.

Some or all of functions of the information processing apparatus 1 according to the embodiments described above may be realized by a computer. In that case, some or all may be realized by recording a program for realizing functions in a computer-readable recording medium and causing a computer system to read the program recorded in the recording medium to execute the program. Note that a "computer system" referred to here includes OS and hardware such as peripheral devices. Moreover, a "computer-readable recording medium" means a storage device such as a portable medium such as a flexible disk, a magneto-optical disc, ROM, and CD-ROM, and a hard disk embedded in the computer system. Furthermore, the "computer-readable recording medium" may also include one that dynamically holds a program for a short time like a communication line when the program is transmitted via a network such as Internet and a communication line such as a telephone line, and one that holds a program in a fixed time like a volatile memory in a computer system that is a server or a client in that case. Moreover, the program may be one for realizing some of functions described above, may be one that can be realized by further combining the functions described above with a program already recorded in the computer system, or may be one that is realized by using a programmable logic device such as a field programmable gate array (FPGA).

As described above, the embodiments of the present invention have been described in detail with reference to the drawings, but the specific configuration is not limited to the above and various design changes and the like can be made without departing from the scope of the present invention. Accordingly, the scope of the invention should be limited only by the attached claims.

REFERENCE SYMBOLS 1, 1a, 1b information processing apparatus
2 chassis
3 connection part
5 desktop
6 task bar
7 OSK
8 tool bar
9 VPTP
10 touch screen
11 display screen
12 touch panel
110 display unit
120 detecting unit
130, 130a, 130b first control unit
140, 140a, 140b second control unit
150 storage unit
1300 posture detecting module
1301 mode determining module
1302 display processing module
1303 threshold information acquiring module
1304 function control module
1400 posture information acquiring module
1401 contact information acquiring module
1402 function setting module
1403 polling rate setting module
1404 touch operation determining module
1405 threshold setting module
1406 signal processing module

The invention claimed is:

1. An information processing apparatus comprising:
a display unit;
a touch panel that detects a touch position at which a touch operation is performed on the display unit;
a function setting module that sets at least one area of a first area functioning as a touch screen and a second area functioning as a precision touch pad with respect to a touch panel area where the touch panel is formed; and
a polling rate setting module that raises a polling rate in an area where the second area is set in the touch panel area when the second area is set for the touch panel area;
a sensor device that determines a posture of the apparatus;
a posture detecting module that detects a posture of the apparatus based on posture information related to the posture of the apparatus acquired by the sensor device;
a mode determining module that determines a mode in which the apparatus is used based on the detected posture, wherein the determined mode is a book mode or a clamshell mode;
a display processing module that displays a virtual precision touch pad, which is the precision touch pad as a virtual pad, at a position in the touch panel area according to the determined mode, wherein, when the mode determining module determines a book mode, the display processing module displays a virtual precision touch pad at a preset position in the touch panel area, wherein the preset position is based on information acquired by the sensor device as a position corresponding to a thumb of a user; and a touch operation determining module that determines whether the touch operation is an operation on which a process should be performed based on a magnitude relationship of contact information with respect to a threshold, the contact information being information related to contact between an operation medium and the touch panel that is acquired when the touch operation by the operation medium is performed.

2. The information processing apparatus according to claim 1, wherein the polling rate setting module raises the polling rate in the area where the second area is set in the touch panel area up to at least 125 Hz.

3. The information processing apparatus according to claim 1, wherein the polling rate setting module restores the polling rate in the area where the second area is set in the touch panel area when setting of the second area is canceled.

4. The information processing apparatus according to claim 1, further comprising:
a threshold setting module that changes the threshold in the area where the second area is set in the touch panel area to a value different from the threshold in another area in the touch panel area when the second area is set for the touch panel area.

5. The information processing apparatus according to claim 4, wherein the threshold setting module restores the threshold in the area where the second area is set in the touch panel area when setting of the second area is canceled.

6. A control method for an information processing apparatus comprising a display unit and a touch panel that detects a touch position at which a touch operation is performed on the display unit, the control method comprising:
setting, by a function setting module, at least one area of a first area functioning as a touch screen and a second area functioning as a precision touch pad with respect to a touch panel area where the touch panel is formed;
raising, by a polling rate setting module, a polling rate in an area where the second area is set in the touch panel area when the second area is set for the touch panel area;
determining, by a sensor device, a posture of the apparatus;
detecting, by a posture detecting module, a posture of the apparatus based on posture information related to the posture of the apparatus acquired by the sensor device;
determining, by a mode determining module, a mode in which the apparatus is used based on the detected posture, wherein the determined mode is a book mode or a clamshell mode;
displaying, by a display processing module, a virtual precision touch pad, which is the precision touch pad as a virtual pad, at a position in the touch panel area according to the determined mode,
wherein, when the mode determining module determines a book mode, the display processing module displays a virtual precision touch pad at a preset position in the touch panel area, wherein the preset position is based on information acquired by the sensor device as a position corresponding to a thumb of a user; and
determining, by a touch operation determining module, whether the touch operation is an operation on which a process should be performed based on a magnitude relationship of contact information with respect to a threshold, the contact information being information related to contact between an operation medium and the touch panel that is acquired when the touch operation by the operation medium is performed.

7. An information processing apparatus comprising:
a display unit;
a touch panel that detects a touch position at which a touch operation is performed on the display unit;
a function setting module that sets at least one area of a first area functioning as a touch screen and a second area functioning as a precision touch pad with respect to a touch panel area where the touch panel is formed; and
a polling rate setting module that raises a polling rate in an area where the second area is set in the touch panel area when the second area is set for the touch panel area;
a sensor device that determines a posture of the apparatus;
a posture detecting module that detects a posture of the apparatus based on posture information related to the posture of the apparatus acquired by the sensor device;
a mode determining module that determines a mode in which the apparatus is used based on the detected posture, wherein the determined mode is a book mode or a clamshell mode;
a display processing module that displays a virtual precision touch pad, which is the precision touch pad as a virtual pad, at a position in the touch panel area according to the determined mode,
wherein, when the mode determining module determines a clamshell mode, the display processing module displays a virtual precision touch pad at a preset position in the touch panel area, wherein the preset position is based on information acquired by the sensor device as corresponding to a position, toward the user, that facilitates performing a touch operation; and
a touch operation determining module that determines whether the touch operation is an operation on which a process should be performed based on a magnitude relationship of contact information with respect to a threshold, the contact information being information related to contact between an operation medium and the touch panel that is acquired when the touch operation by the operation medium is performed.

8. The information processing apparatus according to claim 7, wherein the polling rate setting module raises the polling rate in the area where the second area is set in the touch panel area up to at least 125 Hz.

9. The information processing apparatus according to claim 7, wherein the polling rate setting module restores the polling rate in the area where the second area is set in the touch panel area when setting of the second area is canceled.

10. The information processing apparatus according to claim 7, further comprising:
a threshold setting module that changes the threshold in the area where the second area is set in the touch panel area to a value different from the threshold in another area in the touch panel area when the second area is set for the touch panel area.

11. The information processing apparatus according to claim 10, wherein the threshold setting module restores the threshold in the area where the second area is set in the touch panel area when setting of the second area is canceled.

12. The information processing apparatus according to claim 7, wherein, when the mode determining module determines a book mode, the display processing module displays a virtual precision touch pad at a preset position in the touch panel area, wherein the preset position is based on information acquired by the sensor device as corresponding to a thumb of a user.

13. A control method for an information processing apparatus comprising a display unit and a touch panel that detects a touch position at which a touch operation is performed on the display unit, the control method comprising:

setting, by a function setting module, at least one area of a first area functioning as a touch screen and a second area functioning as a precision touch pad with respect to a touch panel area where the touch panel is formed;

raising, by a polling rate setting module, a polling rate in an area where the second area is set in the touch panel area when the second area is set for the touch panel area;

determining, by a sensor device, a posture of the apparatus;

detecting, by a posture detecting module, a posture of the apparatus based on posture information related to the posture of the apparatus acquired by the sensor device;

determining, by a mode determining module, a mode in which the apparatus is used based on the detected posture, wherein the determined mode is a book mode or a clamshell mode;

displaying, by a display processing module, a virtual precision touch pad, which is the precision touch pad as a virtual pad, at a position in the touch panel area according to the determined mode, wherein, when the mode determining module determines a clamshell mode, the display processing module displays a virtual precision touch pad at a preset position in the touch panel area, wherein the preset position is based on information acquired by the sensor device as corresponding to a position, toward the user, that facilitates performing a touch operation; and determining, by a touch operation determining module, whether the touch operation is an operation on which a process should be performed based on a magnitude relationship of contact information with respect to a threshold, the contact information being information related to contact between an operation medium and the touch panel that is acquired when the touch operation by the operation medium is performed.

14. The control method according to claim 13, wherein, when the mode determining module determines a book mode, the display processing module displays a virtual precision touch pad at a preset position in the touch panel area, wherein the preset position is based on information acquired by the sensor device as corresponding to a thumb of a user.

* * * * *